US012668915B2

(12) United States Patent (10) Patent No.: US 12,668,915 B2

Addison et al. (45) Date of Patent: Jun. 30, 2026

(54) HANDHELD STEAMING WAND FOR A PRESSING AND STEAMING KIOSK

(71) Applicant: LaundrySucks.io Inc., Sandy Springs, GA (US)

(72) Inventors: Jonathan Ryan Addison, Roswell, GA (US); Serge William Kadjo Kablan, Smyrna, GA (US); Nishant Jain, Roswell, GA (US); Thibault Corens, Sandy Springs, GA (US)

(73) Assignee: LaundrySucks.io Inc., Sandy Springs, GA (US)

( * ) Notice: Subject to any disclaimer, the term of this patent is extended or adjusted under 35 U.S.C. 154(b) by 0 days.

(21) Appl. No.: 18/913,692

(22) Filed: Oct. 11, 2024

(65) Prior Publication Data

US 2025/0101673 A1 Mar. 27, 2025

Related U.S. Application Data

(63) Continuation-in-part of application No. 18/582,637, filed on Feb. 20, 2024, now Pat. No. 12,351,974.

(Continued)

(51) Int. Cl.
D06F 73/02 (2006.01)
D06F 34/18 (2020.01)

(Continued)

(52) U.S. Cl.
CPC .............. D06F 73/02 (2013.01); D06F 34/18 (2020.02); D06F 34/20 (2020.02); D06F 58/10 (2013.01);

(Continued)

(58) Field of Classification Search
CPC .......... D06F 58/44; D06F 73/02; D06F 58/38; D06F 34/20; D06F 58/10; D06F 34/18; D06F 58/203; D06F 2105/58; D06F 2105/52; D06F 2105/20; D06F 2103/64; D06F 2105/12; D06F 2103/62;

(Continued)

(56) References Cited

U.S. PATENT DOCUMENTS

| | | | | | |
|---|---|---|---|---|---|
| 3,583,610 | A | * | 6/1971 | Forse | D06F 73/00 |
| | | | | | 223/74 |
| 3,707,855 | A | * | 1/1973 | Buckley | D06F 87/00 |
| | | | | | 68/6 |

(Continued)

*Primary Examiner* — Benjamin L Osterhout

(74) *Attorney, Agent, or Firm* — Run8 Patent Group, LLC; Peter Miller; Marissa Kohrman

(57) ABSTRACT

A kiosk for steaming and pressing a garment includes: a chamber; a hanger arranged within the chamber and configured to receive a garment; a first steam nozzle arranged below the hanger and configured to expel a first steam jet toward an interior surface of the garment. The kiosk further includes a wand configured for manual manipulation over select regions of the garment to remove wrinkles from select regions of the garment and including: a head configured to mate with a mount arranged inside the chamber; a second steam nozzle arranged on the head and configured to expel a second steam jet of pressurized steam; and a steam supply line configured to deliver steam from a steam generator to the second steam nozzle and defining a length to enable the head to extend within the chamber.

20 Claims, 6 Drawing Sheets

Related U.S. Application Data

(60) Provisional application No. 63/543,711, filed on Oct. 11, 2023, provisional application No. 63/446,765, filed on Feb. 17, 2023.

(51) Int. Cl.

| | |
|---|---|
| *D06F 34/20* | (2020.01) |
| *D06F 58/10* | (2006.01) |
| *D06F 58/20* | (2006.01) |
| *D06F 58/38* | (2020.01) |
| *D06F 58/44* | (2020.01) |
| *D06F 103/06* | (2020.01) |
| *D06F 103/62* | (2020.01) |
| *D06F 105/12* | (2020.01) |
| *D06F 105/20* | (2020.01) |
| *D06F 105/40* | (2020.01) |
| *D06F 105/44* | (2020.01) |
| *D06F 105/52* | (2020.01) |
| *D06F 105/58* | (2020.01) |
| *G06V 20/60* | (2022.01) |
| *D06F 103/64* | (2020.01) |

(52) U.S. Cl.
CPC ............ D06F 58/203 (2013.01); D06F 58/38 (2020.02); D06F 58/44 (2020.02); *D06F 2103/06* (2020.02); *D06F 2103/62* (2020.02); *D06F 2103/64* (2020.02); *D06F 2105/12* (2020.02); *D06F 2105/20* (2020.02); *D06F 2105/40* (2020.02); *D06F 2105/44* (2020.02); *D06F 2105/52* (2020.02); *D06F 2105/58* (2020.02); *G06V 20/60* (2022.01)

(58) Field of Classification Search
CPC ............ D06F 2103/06; D06F 2105/40; D06F 2105/44; G06V 20/60
See application file for complete search history.

(56) References Cited

U.S. PATENT DOCUMENTS

| | | | | |
|---|---|---|---|---|
| 4,728,015 A * | 3/1988 | Holzapfel | .............. | D06F 73/00 223/70 |
| 4,980,981 A * | 1/1991 | Naidoo | .................. | D06F 69/00 38/144 |
| 5,305,484 A * | 4/1994 | Fitzpatrick | .............. | D06F 73/02 68/6 |
| 5,609,047 A * | 3/1997 | Hellman, Jr. | .......... | D06F 73/00 68/222 |
| 5,815,961 A * | 10/1998 | Estes | ....................... | D06F 73/02 38/14 |
| 8,464,562 B1 * | 6/2013 | Colburn | .................. | D06F 73/02 68/222 |
| 12,209,352 B2 * | 1/2025 | Jain | ...................... | D06F 58/203 |
| 12,227,894 B2 * | 2/2025 | Roh | ....................... | D06F 73/02 |
| 2004/0112095 A1 * | 6/2004 | Bolduan | ................ | D06F 17/04 68/184 |
| 2005/0115120 A1 * | 6/2005 | Cevik | ..................... | D06F 73/02 38/14 |
| 2005/0132761 A1 * | 6/2005 | Carrubba | ................ | D06F 73/00 68/222 |
| 2007/0006484 A1 * | 1/2007 | Moschuetz | ........... | D06F 58/203 34/597 |
| 2008/0217364 A1 * | 9/2008 | Fong | ....................... | D06F 59/02 223/89 |
| 2008/0256989 A1 * | 10/2008 | Jeong | ..................... | D06F 73/02 392/441 |
| 2010/0012689 A1 * | 1/2010 | Guffey | ................... | A47G 25/20 223/66 |
| 2010/0251779 A1 * | 10/2010 | Zaglio | ..................... | D06F 17/04 68/13 R |
| 2011/0030249 A1 * | 2/2011 | Rosenzweig | .......... | D06F 73/00 38/144 |
| 2012/0018461 A1 * | 1/2012 | Azizian | ................... | D06F 73/02 223/66 |
| 2012/0159806 A1 * | 6/2012 | Dana | ..................... | D06F 58/203 68/6 |
| 2012/0317729 A1 * | 12/2012 | Song | ...................... | D06F 58/10 68/6 |
| 2013/0193171 A1 * | 8/2013 | Carter | .................... | D06F 75/12 68/5 R |
| 2014/0223973 A1 * | 8/2014 | Alrefaei | ................. | A47G 25/14 223/51 |
| 2016/0215440 A1 * | 7/2016 | Burger | .................... | D06F 73/02 |
| 2017/0083885 A1 * | 3/2017 | Khadgi | .................. | G07F 17/20 |
| 2017/0268156 A1 * | 9/2017 | Dana | ........................ | D06F 59/02 |
| 2019/0257024 A1 * | 8/2019 | Shin | ........................ | A61L 9/03 |
| 2020/0096954 A1 * | 3/2020 | Kim | ........................ | D06F 34/18 |
| 2020/0370236 A1 * | 11/2020 | Chae | ....................... | D06F 73/00 |
| 2021/0032797 A1 * | 2/2021 | Shin | ....................... | D06F 67/005 |
| 2021/0062404 A1 * | 3/2021 | Ham | ....................... | D06F 71/20 |

* cited by examiner

HANDHELD STEAMING WAND FOR A PRESSING AND STEAMING KIOSK

CROSS-REFERENCE TO RELATED APPLICATIONS

This application claims the benefit of U.S. Provisional Application No. 63/543,711, filed on 11 Oct. 2023, which is incorporated in its entirety by this reference.

This application is a continuation-in-part of U.S. patent application Ser. No. 18/582,637, filed on 20 Feb. 2024, which claims the benefit of U.S. Provisional Application No. 63/446,765, filed on 17 Feb. 2023, each of which is incorporated in its entirety by this reference.

This application is related to U.S. patent application Ser. No. 18/798,695, filed on 8 Aug. 2024, and Ser. No. 17/632,709, filed on 3 Feb. 2022, and Ser. No. 17/258,531, filed on 7 Jan. 2021, each of which are incorporated in their entireties by this reference.

TECHNICAL FIELD

This invention relates generally to the field of dry cleaning and more specifically to a new and useful method for autonomously pressing and steaming a garment in a kiosk 100 in the field of garment pressing and cleaning.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
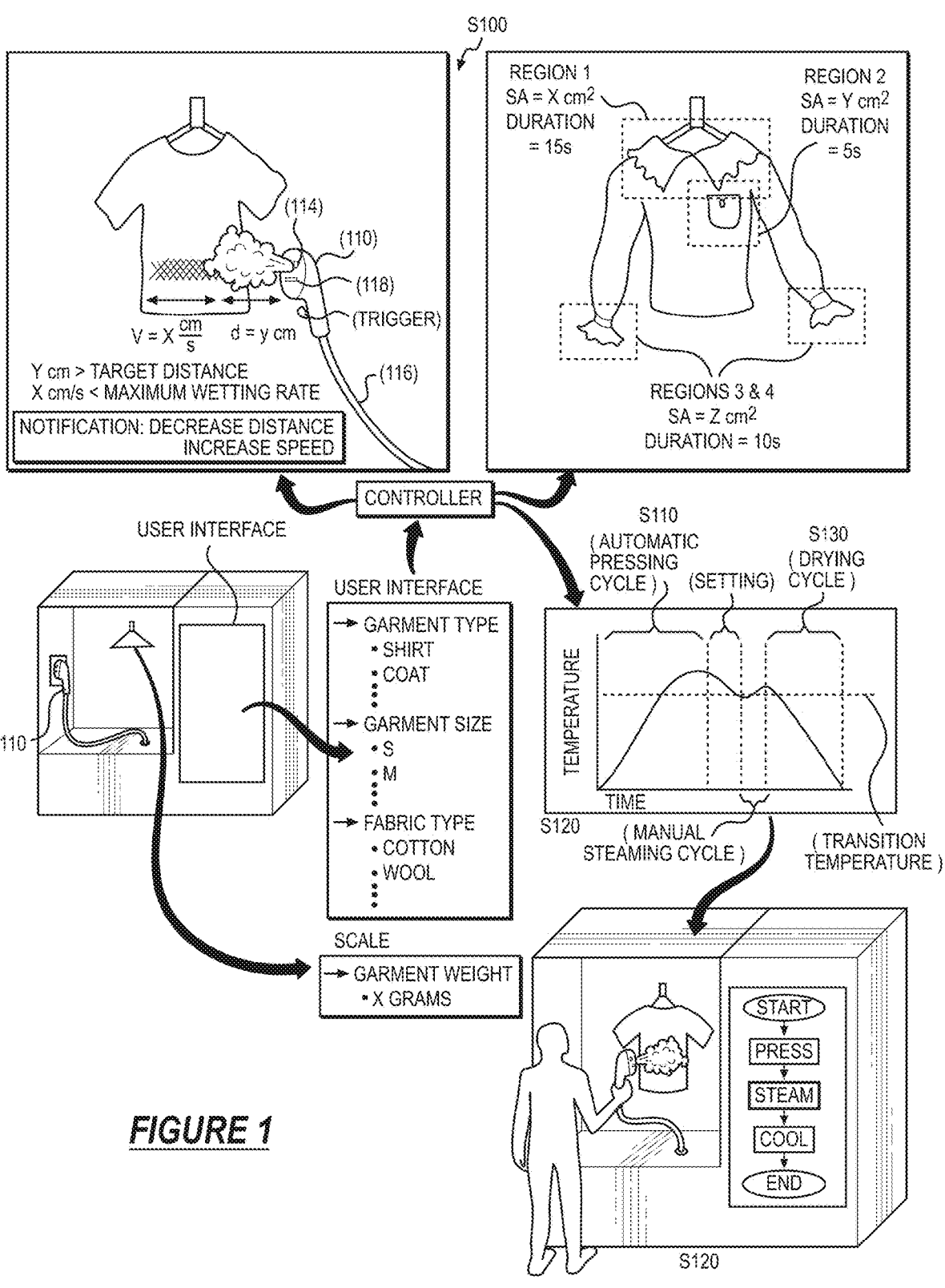
FIG. 1 is a flowchart representation of a method.
Figure 2:
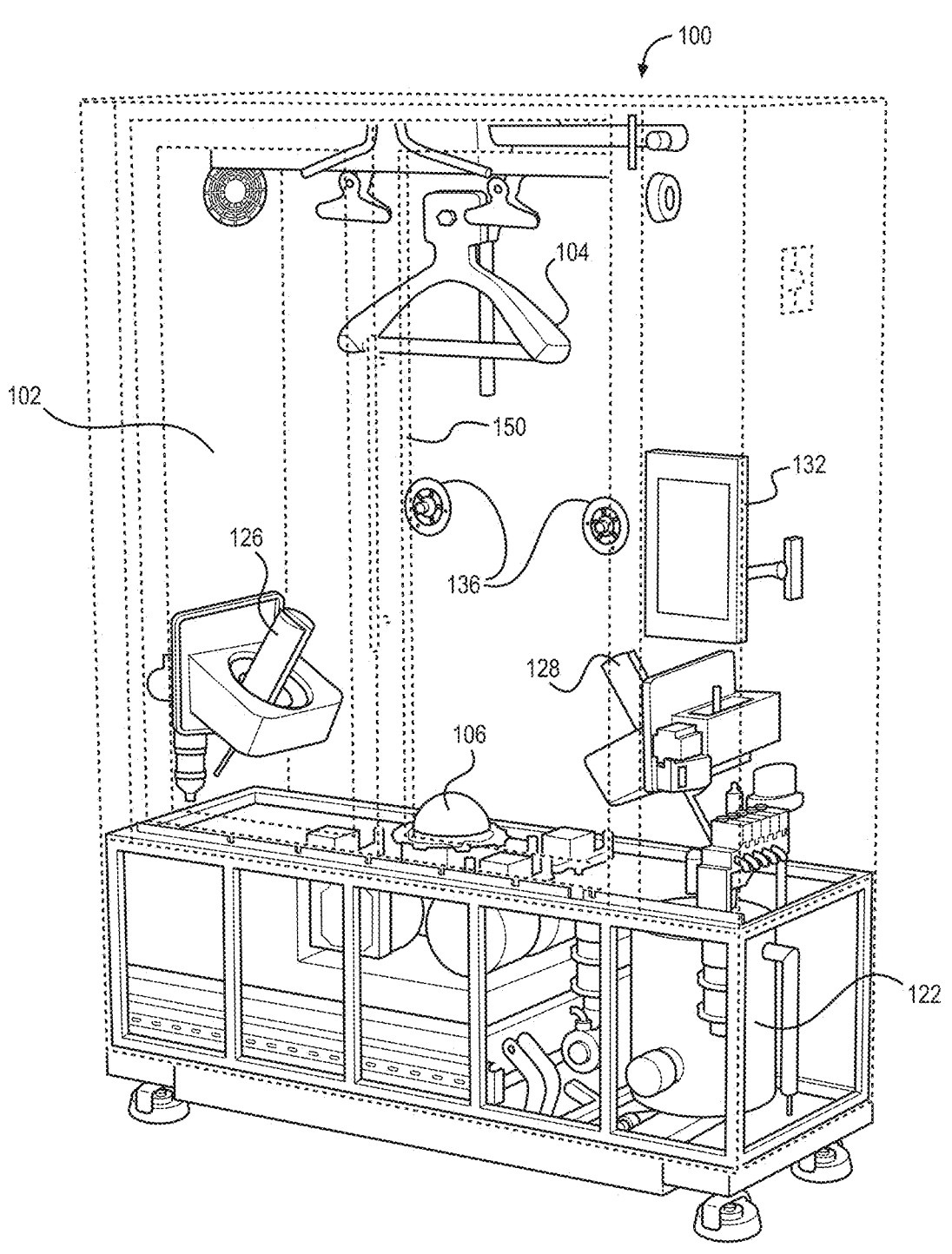
FIG. 2 is a flowchart representation of a system.

As shown in FIGS. 1 and 2, a kiosk 100 for steaming and pressing a garment includes: a chamber 102; a hanger 104 arranged within the chamber 102 and configured to receive a garment; a first steam nozzle 106 arranged below the hanger 104 and configured to expel a first steam jet along a nozzle axis and toward an interior surface of the garment to tension local regions of a torso of the garment and increase temperature of the garment toward a target temperature; and an actuator 108 configured to traverse the first steam nozzle 106 across the interior surface of the garment.

The kiosk 100 further includes a wand 110 configured for manual manipulation over a select region of the garment to remove wrinkles from the select region of the garment and including: a head 112 configured to mate with a mount 134 arranged inside the chamber 102; a second steam nozzle 114 arranged on the head 112 and configured to expel a second steam jet of pressurized steam; and a steam supply line 116 configured to deliver steam from a steam generator 122 to the second steam nozzle 114 and defining a length to enable the head 112 to extend within the chamber 102 of the kiosk 100.

2. Method

As shown in FIGS. 1 and 4-6, a method S100 for steaming a garment at a kiosk 100 includes, while the garment occupies a chamber 102 within the kiosk 100: during an automatic cycle, articulating a first steam nozzle 106, arranged within the kiosk 100, along a target steam nozzle path to impinge a first steam jet across an interior surface of the garment and tension local areas of the garment against the first steam jet in Block S110; during a manual steaming cycle succeeding the automatic cycle, triggering a valve to release steam to a wand 110 for manual manipulation over a select region of the garment to impinge a second steam jet across the select region of the garment and release wrinkles in the select region of the garment in Block S120; and, during a drying cycle succeeding the manual steaming cycle, actuating a set of dryers 136 to drive a chamber temperature of the chamber 102 toward a target drying temperature and to remove moisture, applied to the garment during the automatic cycle and the manual steaming cycle, from the garment in Block S130.

2.1 Variation: Setting Processing Parameters Based on Garment Characteristics

In one variation, the method S100 for steaming a garment at a kiosk 100 includes: accessing a set of garment characteristics including a garment dimension, a garment type, and a fabric type of a garment loaded into a chamber 102 at the kiosk 100 in Block S102; and deriving a set of processing parameters for the garment based on the set of garment characteristics, the set of processing parameters including a target processing temperature, a target setting temperature, and a manual steaming duration in Block S044.

The method S100 further includes, during an automatic cycle at the kiosk 100: actuating a set of heating elements in the kiosk 100 to drive an ambient environment within the chamber 102 toward the target processing temperature in Block S112; articulating a steam nozzle, facing an interior surface of the garment, along a steam nozzle path to expel steam across the interior surface of the garment and to heat local areas of the garment above a transition temperature of the garment in Block S110. The method further includes, in response to completion of the steam nozzle path by the steam nozzle, actuating a set of dryers 136 to drive the ambient environment within the chamber 102 toward the target chamber 102 setting temperature in Block S130.

The method S100 further includes, during a manual steaming cycle at the kiosk 100: serving a prompt to manually steam the garment inside the kiosk 100 in Block S122; and initiating a manual steaming timer for the manual steaming duration in Block S124; and activating the handheld steaming wand 110 to expel steam in Block S120.

The method S100 further includes, during a cooling cycle following expiration of the manual steaming timer, actuating a set of dryers 136: to cool the garment below the target chamber 102 setting temperature; and to remove moisture from the garment.

3

2.2 Variation: Real-Time Distance Feedback

In one variation, the method S100 includes accessing a target manual steaming distance between the handheld steaming wand 110 and the garment in Block 104 and, during the manual steaming cycle at the kiosk 100: in response to a user input, activating the handheld steaming wand 110 to expel steam in Block S120; accessing a first signal from a distance sensor arranged on the handheld steaming wand 110 in Block S126; based on the first signal, interpreting a first distance between the handheld steaming wand 110 and the garment in Block S128; and, in response to the first distance falling below the target manual steaming distance, serving a first prompt user to increase the distance between the handheld steaming wand 110 and garment in Block S144.

2.3 Variation: Real-Time Wetting Rate Feedback

In one variation, the method S100 includes deriving the set of processing parameters for the garment based on the set of garment characteristics in Block S104, the set of processing parameters including: a target processing temperature; a target setting temperature; a manual steaming duration; and a maximum wetting rate.

The method S100 further includes, at a first time during the manual steaming cycle at the kiosk 100: accessing a first signal from a distance sensor arranged on the handheld steaming wand 110 in Block S126, the first signal representing a first distance between the handheld steaming wand 110 and the garment; accessing a first set of motion data from a motion sensor arranged on the handheld steaming wand 110 in Block S127, the first set of motion data representing a first position of the handheld steaming wand 110 relative to the garment; and interpreting a first location of steam jet impingement on the garment at the first time based on the first distance and the first position in Block S128.

The method S100 further includes, at a second time during the manual steaming cycle at the kiosk 100: accessing a second signal from the distance sensor arranged on the handheld steaming wand 110, the second signal representing a second distance between the handheld steaming wand 110 and the garment in Block S126; accessing a second set of motion data from the motion sensor, the second set of motion data representing a second position of the handheld steaming wand 110 relative to the garment in Block S127; and interpreting a second location of steam jet impingement on the garment at the second time based on the second distance and the second position in Block S128.

The method further includes, during the manual steaming cycle at the kiosk 100: calculating a traversal rate of steam jet on the garment based on the first location, the first time, the second location, and the second time in Block S142; estimating a wetting rate of the garment proximal the first location and the second location based on the traversal rate in Block S144; and, in response to the wetting rate exceeding the maximum wetting rate, prompting the user to increase traversal speed of the handheld steaming wand 110 in Block S146.

2.4 Variation: Deactivation of the Handheld Steaming Wand

In one variation, the method S100 includes, during the manual steaming cycle at the kiosk 100: accessing a first signal from an optical sensor 140 arranged in the kiosk 100 in Block S126; based on the first signal, identifying absence of the handheld steaming wand 110 in a chamber 102 of the kiosk 100 in Block S148; and, in response to identifying the absence of the handheld steaming wand 110 in the chamber 102 of the kiosk 100, deactivating the handheld steaming wand 110 in Block S140.

In this variation, the method S100 also includes, during the manual steaming cycle: accessing a second signal from an optical sensor 140 arranged in the kiosk 100 in Block S126; based on the second signal, identifying the handheld steaming wand 110 inside the chamber 102 of the kiosk 100 in Block S148; and, in response to identifying the handheld steaming wand 110 inside the chamber 102 of the kiosk 100, activating the handheld steaming wand 110 to expel the steam jet in Block S120.

2.5 Variation: Sequential Manual Steaming

In one variation, the method S100 includes: accessing a set of garment characteristics including a garment dimension, a garment type, and a fabric type of a garment loaded into a chamber 102 of a kiosk 100 in Block S102; and, based on the set of garment characteristics, deriving a set of processing parameters for the garment including a target processing temperature, a target setting temperature, and a set of manual steaming durations in Block S104.

In this variation, the method S100 includes, at a first time during the manual steaming cycle at the kiosk 100: serving a prompt to manually steam a first region of the garment inside the kiosk 100 in Block S122; initiating a first manual steaming timer for the first manual steaming duration in the set of manual steaming durations in Block S124; activating the handheld steaming wand 110 to expel steam in Block S120; and, following expiration of the first manual steaming timer, deactivating the handheld steaming wand 110 in Block S140.

In this variation, the method S100 further includes, at a second time during the manual steaming cycle at the kiosk 100: serving a prompt to manually steam a second region of the garment in Block S122; initiating a second manual steaming timer for the second manual steaming duration in the set of manual steaming durations in Block S124; activating the handheld steaming wand 110 to expel steam in Block S120; and, following expiration of the second manual steaming timer, deactivating the handheld steaming wand 110 in Block S140.

3. Applications

Generally, the method S100 can be executed autonomously by a kiosk 100 to: receive a garment; retrieve characteristics of the garment; derive autonomous processing parameters for the autonomous steaming cycle; derive manual steaming parameters for the manual steaming cycle; autonomously execute the autonomous steaming cycle based on autonomous processing parameters by heating ambient environment within the chamber 102 of the kiosk 100, steaming local areas of the garment at a temperature near a transition temperature of the garment to release wrinkles, and cooling the ambient environment and the garment below transition temperature to set fabric without wrinkles. The method S100 can further be executed by the kiosk 100 to selectively guide and enable the user to manually operate a handheld steaming wand 110 (also referred to as "the wand 110") to spot-steam (or "touch up") regions of the garment, such as to remove wrinkles from regions missed by the kiosk 100 during the autonomous steaming cycle, incompletely steamed by the kiosk 100 during the autonomous steaming cycle or exhibiting excessive wrinkling when loaded into the kiosk 100. In particular, after the autonomous steaming cycle, the kiosk 100 can: maintain elevated temperature within the kiosk 100, unlock a door 150 of the kiosk 100; and prompt a user to manipulate the handheld steaming wand 110 over regions of the garment that still exhibit wrinkles. For example, the kiosk 100 can: control duration of steam ejection from the handheld steaming wand 110 based on garment characteristics, such as to avoid over-wetting or damaging the garment; return real-time feedback to the user to adjust the distance between the handheld steaming wand 110 and/or motion of the handheld steaming wand 110, such as to avoid over-wetting of the garment, avoid damaging the garment, and guide the user toward removing remaining wrinkles from the garment.

More specifically, the kiosk 100 can execute Blocks of the method S100 to access garment characteristics of a garment loaded into the kiosk 100, such as including: garment dimension and/or size; garment type (e.g., shirt, jacket, pants); and fabric type (e.g., cotton, silk, polyester) of the garment. The kiosk 100 can further execute Blocks of the method S100 to derive processing parameters for a subsequent processing cycle on the garment based on these garment characteristics. For example, the computer system can calculate or retrieve a target processing temperature near and below a transition temperature of the fabric of the garment in order to prepare the garment for rapid wrinkle release with application of steam during the automatic cycle. Additionally, or alternatively, the computer system can calculate or retrieve a target setting temperature for setting the garment without wrinkles after application of steam across the garment during the automatic cycle. Additionally, or alternatively, the computer system can calculate or retrieve a manual steaming duration of a manual steaming cycle—following the automatic cycle—in which the kiosk 100 releases steam through the handheld steam wand 110 responsive to input by a user manipulating the handheld steam wand 110 across select regions of the garment to "touch up" wrinkles in these regions.

More specifically, based on the characteristic of the garment, the kiosk 100 can derive: a target chamber 102 steaming temperature near and below a transition temperature of the fabric of the garment at which fibers of the garment loosen, such as through breaking of hydrogen bonds; a target chamber 102 setting temperature that sets (or "hardens") fibers of the garment, such as due to formation of hydrogen bonds between fibers; and a manual steaming duration during which the kiosk 100 supplies steam to the handheld steam wand 110 to enable the user to manually steam and remove wrinkles from select regions of the garment that may still exhibit wrinkles after completion of the automatic cycle.

Thus, once the garment is loaded into the kiosk 100, the kiosk 100 executes an automatic cycle including: driving an ambient environment within the chamber 102 toward the target chamber 102 steaming temperature; articulating a first steam nozzle 106 along a steam nozzle path (also referred to herein as "target steam nozzle path") to expel a first steam jet across the interior surface of the garment, thereby stretching, wetting, and heating regions of the garment above the transition temperature of the fabric of the garment; and, in response to completion of the steam nozzle path by the first steam nozzle 106, driving the ambient environment within the chamber 102 toward the target chamber 102 setting temperature to set the garment substantially without wrinkles after local stretching, wetting, and heating of the garment.

Therefore, during the automatic cycle the kiosk 100 can: drive the ambient environment within the chamber 102 toward the target chamber 102 steaming temperature to loosen the fibers of the garment; steam the inside of the garment via a first steam jet expelled from the first steam nozzle 106 to release wrinkles in the fabric of the garment; and then drive the ambient environment within the chamber 102 to set the fibers of the garment in their current (e.g., wrinkle-free) state. In particular, the kiosk 100 can drive the ambient environment to a temperature low enough for the fibers of the garment to set and for the user be able to comfortably reach inside the chamber 102, and high enough to quickly increase the temperature of the garment above the transition temperature during the manual pressing cycle.

Once the kiosk 100 drives the ambient environment within the chamber 102 to the target chamber 102 setting temperature, the kiosk 100 can execute a manual steaming cycle, including: prompting the user to manually steam the garment inside the kiosk 100; unlocking the door 150 of the chamber 102; initiating a manual steaming timer for the manual steaming duration; and activating the handheld steaming wand 110 to expel the second steam jet as the user manually manipulates the handheld steaming wand 110 across select regions of the garment that exhibit wrinkles or incomplete wrinkles release following the automatic cycle. Therefore, during the manual steaming cycle, the kiosk 100 can enable the user to visually inspect the garment, identify wrinkled regions of the garment, and manually steam these wrinkled regions to remove extant wrinkles and achieve a desired or target final appearance of the garment. Thus, the kiosk 100 can: execute the automatic cycle to rapidly, accurately, and repeatably steam local regions of the garment (e.g., despite limited garment information or real-time garment sensing) by autonomously sweeping the first steam nozzle 106 across the interior surface of the garment; and then execute the manual steaming cycle to enable the user to touch up regions of the garment in which wrinkles were not fully released during the automatic cycle. Accordingly, the kiosk 100 can balance rapid total garment automatic steaming with slower manual steaming of select garment regions to quickly and consistently achieve a wrinkle-free garment.

Once the manual steaming cycle is complete, the kiosk 100 can: deactivate the handheld steaming wand 110; prompt the user to return the handheld steaming wand 110 to its dock and to close the door 150 of the kiosk 100; lock the door 150 of the kiosk 100; and then actuate a set of dryers 136 to cool the garment below the target chamber 102 setting temperature and to remove moisture from the garment during the cooling cycle. Therefore, during the cooling cycle, the kiosk 100 can drive the ambient environment within the chamber 102 below the target chamber 102 setting temperature to: set fibers of the garment in their current wrinkle-free state; dry the garment; and bring the garment to a temperature that is comfortable for handling and/or wearing. Thus, the kiosk 100 can set the garment in a wrinkle-free state before unlocking the door 150 to enable the user to retrieve the garment.

3.1 Manual Steaming Durations

In one variation, based on the garment characteristics, the kiosk 100 can derive a set of manual steaming durations. Then, at a first time during the manual steaming cycle, the kiosk 100 can: serve the prompt to manually steam a first region of the garment; initiate a first manual steaming timer for the first manual steaming duration in the set of manual steaming durations; activate the handheld steaming wand 110 to expel steam; and, following expiration of the first manual steaming timer, deactivate the handheld steaming wand 110. In this variation, at a second time during the manual steaming cycle, the kiosk 100 can: serve a prompt to manually steam a second region of the garment; initiate a second manual steaming timer for the second manual steaming duration in the set of manual steaming durations; activate the handheld steaming wand 110 to expel steam; and, following expiration of the second manual steaming timer, deactivate the handheld steaming wand 110. In one example, at the first time during the manual steaming cycle, the user can: manipulate the handheld steaming wand 110 across a pocket of the garment to release wrinkles on the pocket of the garment. In this example, at the second time during the manual steaming cycle, the user can: manipulate the handheld steaming wand 110 across a collar the of the garment to release wrinkles on the collar of the garment.

Therefore, the kiosk 100 can define a set of manual steaming durations based on the garment characteristics. For example, for a garment such as a shirt with a collar and a breast pocket, the kiosk 100 can define two manual steaming durations-first manual steaming duration for manual steaming of the collar and the second manual steaming duration for seaming of the pocket. Accordingly, during the manual pressing cycle, the kiosk 100 can enable the user to inspect garment to identify wrinkled regions (e.g., collar, pocket) and steam different regions of the garment separately, thereby enabling the user to manipulate the garment between steaming sessions and conserving steam when the handheld steaming wand 110 is not directed toward a wrinkled region of the garment.

3.2 Steam Impingement Tracking

In one variation, the kiosk 100 can derive a maximum wetting rate for the garment based on the garment characteristics. In this variation, at a first time during the manual steaming cycle, the kiosk 100 can: access a first signal representing a first distance between the handheld steaming wand 110 and the garment from a distance sensor arranged on the handheld steaming wand 110; access a first set of motion data representing a first position of the handheld steaming wand 110 relative to the garment from a motion sensor arranged on the handheld steaming wand 110; and identify a first location of impingement of the second steam jet on the garment. At a second time during the manual steaming cycle, the kiosk 100 can: access a second signal representing a second distance from the distance sensor; access a second set of motion data from the motion sensor; and identify a second location of impingement of the second steam jet on the garment. Then, the kiosk 100 can calculate a traversal rate of the first steam jet on the garment based on the first location, the first time, the second location, and the second time; estimate a wetting rate of the garment proximal first location and second location based on the traversal rate; and, in response to the wetting rate exceeding the maximum wetting rate, prompt the user to increase traversal speed of the handheld steaming wand 110.

Therefore, the kiosk 100 can: track, in real time, the movement of the handheld steaming wand 110 across the surface of the garment; based on the movement of the handheld steaming wand 110, estimate the wetting rate of local regions of the garment; and, if the wetting rate exceeds the maximum wetting rate, provide real-time feedback to the user prompting the user to increase the traversal speed of the handheld steaming wand 110 to avoid overwetting the local regions of the garment.

Similarly, the kiosk 100 can access a target manual steaming distance between the handheld steaming wand 110 and the garment based on the garment characteristics. Then, during the manual steaming cycle, the kiosk 100 can: access a first signal from a distance sensor, the first signal representing a first distance between the handheld steaming wand 110 and the garment; and, in response to the first distance falling below the target manual steaming distance, serve a first prompt to the user to move the handheld steaming wand 110 away from garment. Therefore, the kiosk 100 can: track the distance between the handheld steaming wand 110 and the garment; and provide real-time feedback to the user prompting the user to either move the handheld steaming wand 110 away from the garment to avoid overwetting regions of the garment or move the handheld steaming wand 110 closer to the garment to ensure that the distance between the handheld steaming wand 110 and the garment approximates the target manual steaming distance between the handheld steaming wand 110 and the garment.

Generally, the method S100 can be executed by the kiosk 100 to automatically press the garment and enable manual steaming of the garment. However, the method can also be executed by the kiosk 100 to wash, dry-clean, and/or deodorize the garment.

4. Kiosk

Figure 3A:
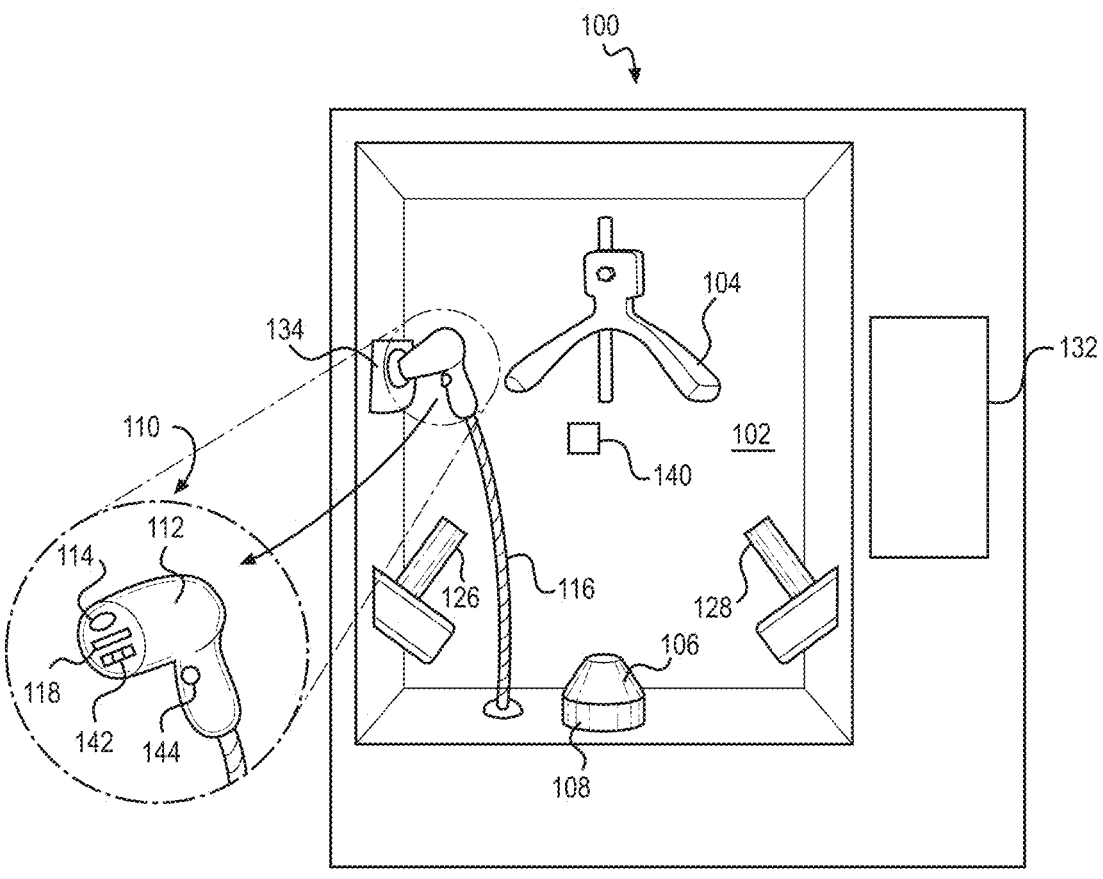
FIG. 3A is a flowchart representation of one variation of the system.

Generally, as shown in FIGS. 2 and 3A, the kiosk 100 for steaming and pressing a garment includes: the chamber 102; the hanger 104 arranged within the chamber 102 and configured to receive a garment; the first steam nozzle 106 arranged below the hanger 104 and configured to expel the first steam jet along a nozzle axis and toward an interior surface of the garment to tension local regions of a torso of the garment and increase temperature of the garment toward the target temperature; and the actuator 108 configured to traverse the first steam nozzle 106 across the interior surface of the garment.

4.1 Steam Supply

Generally, as described in U.S. patent application Ser. Nos. 17/258,531 and 17/632,709, which are incorporated herein by reference, the kiosk 100 includes: the steam generator 122 configure to heat water to steam; the first steam nozzle 106 arranged in the base of the chamber 102 below the hanger 104; a first steam valve configured to selectively release steam from the steam generator 122 to the first steam nozzle 106; a steam supply port arranged within an interior wall of the chamber 102 and interposed between the steam generator 122 and the first steam nozzle 106; and a second steam valve configured to selectively release steam from the steam generator 122 to the steam supply line 116 of the handheld steaming wand 110 through the steam supply port.

4.2 Air Supply

Generally, as described in U.S. patent application Ser. Nos. 17/258,531 and 17/632,709, which are incorporated herein by reference, the kiosk 100 includes: a hot dryer configured to inject heated air into the chamber 102; a cold dryer configured to inject cool air into the chamber 102; a set of air nozzles configured to direct heated and cool air from the hot and cold dryers, respectively, selectively toward and around the garment; an exhaust configured to vent air (e.g., moist, heated air) out of the chamber 102; and a steam generator 122 configured to heat water into steam.

In one implementation, the kiosk 100 includes: a set of dryer nozzles configured to blow fresh external air into the chamber 102; an exhaust vent configured to release humid air from the chamber 102; and a first heat exchanger configured to transfer heat from humid air, exiting the chamber 102 via the exhaust vent, to external air entering the chamber 102 via the set of dryer nozzles. Additionally, or alternatively, the kiosk 100 includes a heating element and a second heat exchanger configured to transfer heat from the heating element to the air entering the chamber 102 via the set of dryer nozzles.

4.3 Retractable Clips

Generally, as described in U.S. patent application Ser. Nos. 17/258,531 and 17/632,709, which are incorporated herein by reference, the kiosk 100 can include a set of retractable clips 124 arranged below the hanger 104 and configured to: retain a bottom edge of the garment; tension the garment against the hanger 104; and spread the base of the garment outwardly from the first steam nozzle 106 arranged below the hanger 104. In one implementation, the first steam nozzle 106 is interposed between the set of retractable clips 124.

4.4 Sleeve Retainers

Generally, as described in U.S. patent application Ser. Nos. 17/258,531 and 17/632,709, which are incorporated herein by reference, the kiosk 100 includes: a first sleeve retainer 126 arranged proximal a first side of the chamber 102 and configured to retain a first sleeve of the garment; a second sleeve retainer 128 arranged proximal a second side of the chamber 102 opposite the first side of the chamber 102 and configured to retain a second sleeve of the garment; a third steam nozzle arranged on the first sleeve retainer 126 and configured to expel a third steam jet within the first sleeve of the garment to tension local areas of the first sleeve of the garment; and a fourth steam nozzle arranged on the second sleeve retainer 128 and configured to expel a fourth steam jet within the second sleeve of the garment to tension local areas of the second sleeve of the garment. Accordingly, the user may use the wand 110 to steam regions of the garment inaccessible to the first steam nozzle 106, the third steam nozzle of the first sleeve retainer 126, and the fourth steam nozzle of the second sleeve retainer 128.

4.5 Expandable Components

Generally, as described in U.S. patent application Ser. Nos. 17/258,531 and 17/632,709, which are incorporated herein by reference, the kiosk 100 can further include: a set of expandable components 130 arranged in the chamber 102 and selectively expandable to stretch local regions of the garment and to obstruct openings in the garment; an air pump; and a set of pressure valves or pressure regulators configured to selectively expand and retract the set of expandable components 130 by distributing air between the air pump and the expandable components. The kiosk 100 can therefore control local temperatures and humidities within the garment during a processing cycle by selectively: expanding an expandable component to close the garment opening and thus increasing the temperature and humidity inside the garment; and retracting the expandable component to unblock the garment opening and thus reducing the temperature and humidity within the garment.

4.6 Cleaning Fluid Spray Nozzles

Generally, as described in U.S. patent application Ser. No. 18/798,695, which is incorporated herein by reference, the kiosk 100 includes a set of nozzles: arranged within the chamber 102 and below the hanger 104; and configured to dispense volumes of a cleaning fluid onto regions of the garment to modify odorous molecules in the garment; and perfume the garment.

4.7 Graphical User Interface

The kiosk 100 also includes a graphical user interface 132: arranged on the kiosk 100 (e.g., on the side of the kiosk 100 visible to the user) and/or the wand 110; and configured to serve graphical and/or textual prompts and/or instructions; and configured to receive user input (e.g., via touchscreen, joystick, or a set of buttons) from the user.

4.8 Wand Mount

The kiosk 100 also includes a wand mount 134: arranged within the chamber 102 of the kiosk 100; and configured to retain the handheld steaming wand 110. In one example, the wand mount 134 is configured to magnetically attach to the handheld steaming wand 110.

4.9 Kiosk Sensors

In one implementation, the kiosk 100 further includes an optical sensor 140: arranged inside the chamber 102 of the kiosk 100; and configured to output images depicting contents of the chamber 102 within the kiosk 100. In one example, the controller 120 can: trigger the optical sensor 140 to capture an image in response to detecting a closed configuration of the kiosk door 150 during an initial setup period (e.g., prior to the automatic steaming cycle); detect a garment in a region of the image; extract a set of features from this region of the image; and derive a set of characteristics of the garment (e.g., garment dimension, garment type, fabric type) based on these features.

In this example, the controller 120 can additionally or alternatively: trigger the optical sensor 140 to capture a sequence of images while the wand is active (e.g., while the second valve is in an open state); in real-time, scan each image in this sequence of images for presence of the wand 110; interpret presence of the wand 110 within the chamber 102 based on detection of elements of the wand 110 in these images; and selectively deactivate the wand 110 in response to not detecting the wand 110 in these images. Therefore, the controller 120 can selectively disable the wand 110 when the wand 110 is removed from the chamber 102 and prevent emission of steam from the wand 110 except when the wand 110 is present within the chamber 102.

4.10 Controller

Generally, the kiosk 100 can include a controller 120 configured to: access a set of garment characteristics of the garment; and, based on the set of garment characteristics, access a set of processing parameters for the garment during an initial setup period. For example, the set of garment characteristics can include a garment type, a fabric type, and a garment size (e.g., dimension) of the garment entered by the user via the user interface 132. The set of processing parameters can include, a processing temperature of the automatic cycle, a steam nozzle path for the first steam nozzle 106, a target drying temperature for the drying cycle, a maximum wetting rate for the second steam nozzle 114, and a minimum distance between the wand 110 and the garment. After the initial setup period, the controller 120 can execute the automatic cycle, the manual steaming cycle, and the drying cycle based on the set of processing parameters.

4.10.1 Initial Setup Period Prior to the Automatic Cycle

In one implementation, during the initial setup period (e.g., prior to the automatic cycle) the controller 120 can: prompt a user to manually manipulate the wand 110 to bring the wand 110 toward the garment to capture images of the garment; trigger a camera arranged on the head 112 of the wand 110 to capture a set of images; access the set of images; based on the set of images, derive the fabric type of the garment; and, based on the fabric type, access a cleaning fluid type for application onto the garment.

Additionally or alternatively, during the initial setup period (e.g., prior to the automatic cycle) the controller 120 can: access the set of images from a camera arranged within the chamber 102 and configured to capture images of the garment; based on the set of images, detect a set of garment regions inaccessible by the first steam nozzle 106, the third steam nozzle of the first sleeve retainer 126, and the fourth steam nozzle of the second sleeve retainer 128; and, in response to detecting the set of garment regions, queue the manual steaming cycle.

In one implementation, prior to the automatic cycle, the controller 120 can: access a fabric type and a size of the garment; and calculate a manual steaming cycle duration based on the fabric type and the size of the garment. Then, during the manual steaming cycle, the controller 120 can trigger the second valve to open, to release pressurized steam from the steam generator 122 to the second steam nozzle 114, for the manual steaming cycle duration.

4.10.2 Automatic Cycle

The controller 120 can initiate the automatic cycle and, during the automatic cycle: trigger the lock to lock the door 150; activate the heating element to heat air within the chamber 102 toward a processing temperature exceeding a transition temperature of the garment; trigger the steam generator to supply steam to the first steam nozzle 106; trigger the actuator to traverse the first steam jet across the interior surface of the garment; and trigger the dryer to reduce air temperature within the chamber 102 below the transition temperature of the garment. In addition, during the automatic cycle, the controller 120 can also: trigger the actuator 108 to traverse the first steam nozzle 106 across the interior surface of the garment and trigger the first valve to release steam to the first steaming nozzle to impinge a first steam jet across an interior surface of the garment. Therefore, during the automatic cycle, the controller 120 can: trigger the heating element to heat air within the chamber 102 to reduce rigidity of garment fibers; trigger the first steam nozzle 106 to execute the target steam nozzle path while simultaneously expelling the first steam jet across the interior of the garment to moisten and tension the interior of the garment and to facilitate wrinkle removal from the garment; and then trigger the dryer to reduce temperature within the chamber 102 to increase rigidity of the garment fibers to set the garment fibers in the wrinkle-free state.

During the automatic cycle, the controller 120 can: detect a state of the door 150 (e.g., based on a signal form a touch sensor); and, in response to detecting an open state of the door 150, trigger the first valve to block passage of steam from the steam generator to the first steam nozzle 106. Therefore, the controller 120 can disable the first steam nozzle 106 when the door 150 is open during the automatic cycle to prevent the steam, expelled from the first steam nozzle 106, from escaping the chamber 102 and potentially burning the user. Conversely, in response to detecting a closed state of the door 150, the controller 120 can trigger the first valve to release steam to the first steam nozzle 106. Therefore, the controller 120 can actuate the first steam nozzle 106 only when the door 150 is locked to prevent the steam, expelled from the first steam nozzle 106, from escaping the chamber 102 and potentially burning the user.

4.10.3 Manual Steaming Cycle

The controller 120 can initiate the manual steaming cycle and during the manual steaming cycle: trigger the lock to unlock the door 150; and, during manual manipulation of the wand across the interior surface of the garment, trigger the steam generator to supply steam to the wand. Therefore, during the manual steaming cycle, the controller 120 can: unlock the door 150 to enable the user to retrieve the wand 100; and then trigger the steam generator to supply steam to the wand to enable the user to manually steam select regions of the garment. For example, the controller 120 can: access the signal from the trigger 144 arranged on the wand, the signal representing user input from the user; and, in response to accessing the signal during the manual steaming cycle, trigger the second valve to open to release steam to the second steam nozzle 114.

During the manual steaming cycle, the controller 120 can: detect a state of the door 150 (e.g., based on a signal form a touch sensor); and, in response to detecting an open state of the door 150, trigger the first valve to release steam from the steam generator to the second steam nozzle 114. Conversely, in response to detecting a closed state of the door, the controller 120 can trigger the first valve to block passage of steam to the second steam nozzle 114. Therefore, the controller 120 can activate the wand only when the door 150 is unlocked to prevent wasting steam, accidentally expelled from the second steam nozzle 114 (e.g., due to controller error, or user input error), when the wand is inaccessible to the user.

In one implementation, during the manual steaming cycle, the controller 120 can: access the first set of signals from a distance sensor arranged on the head 112 of the wand 110 and the second set of signals from a motion sensor arranged on the head 112 of the wand 110; and, based on the first set of signals representing distances between the wand 110 and the garment and the second set of signals representing position and orientation of the wand 110 relative to the garment, calculate the wetting rate of the select region of the garment.

4.10.4 Drying Cycle

In one implementation, the controller 120 can initiate the drying cycle and during the drying cycle: trigger the lock to lock the door; trigger the dryer to extract moist air from the chamber 102 to dry the garment; trigger the dryer to reduce the air temperature within the chamber 102 below the transition temperature of the garment; and trigger the lock to unlock the door. Therefore, the controller 120 can execute the drying cycle to: remove moisture from the garment to make the garment suitable for use immediately after the drying cycle; set the garment in the wrinkle-free state to ensure that the garment remains wrinkle-free over a period of time (e.g., time period spanning a single use or multiple uses of the garment) following the drying cycle; and unlock the door 150 of the kiosk 100 to enable the user to retrieve the garment.

4.11 Handheld Steaming Wand

Figure 3B:
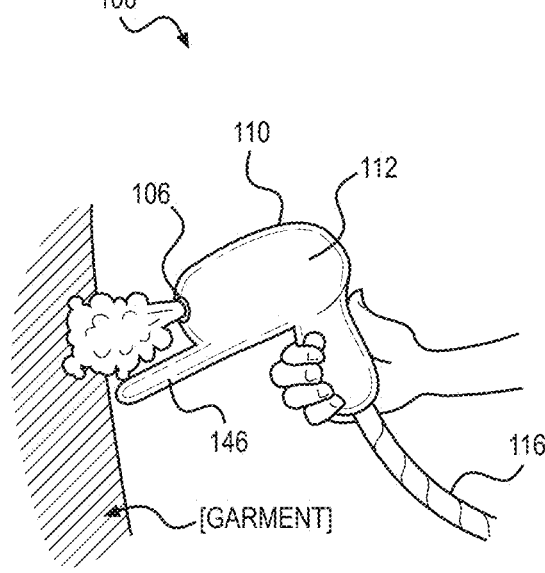
FIG. 3B is a flowchart representation of one variation of the system.

Generally, as shown in FIGS. 3A and 3B, the kiosk 100 further includes the wand 110 configured for manual manipulation over a select region of the garment to remove wrinkles from the select region of the garment. The wand 110 includes: a head 112 (i.e., wand head) configured to mate with a mount arranged inside the chamber 102; a second steam nozzle 114 arranged on the head 112 and configured to expel a second steam jet of pressurized steam; and a steam supply line 116 configured to deliver steam from a steam generator 122 to the second steam nozzle 114 and defining a length to enable the head 112 to extend within the chamber 102 of the kiosk 100.

The handheld steaming wand 110 also includes a suction slit 118: arranged on the head 112 proximal the second steam nozzle 114; coupled to the vacuum line; and configured to collect liquid water forming on the head 112 during expulsion of the second steam jet from the second steam nozzle 114.

In one implementation, shown in FIG. 3B, the handheld steaming wand 110 includes a contact feature 146: extending forward from the second steam nozzle 114; configured to contact the garment during the manual manipulation of the wand 110; and configured to maintain the second steam nozzle 114 at greater than a threshold distance from the garment to reduce risk of pressurized steam, exiting the second steam nozzle 114, overwetting the garment.

In one implementation, the handheld steaming wand 110 can include a trigger 144 arranged on the head 112 and configured to receive user input and activate the second steam nozzle 114 to release the second steam jet in response to the user input. In one example, the trigger 144 can include a push-button configured to activate the second steam nozzle 114 to release the second steam jet when the push-button is pressed by the user. Additionally, or alternatively, the handheld steaming wand 110 can include the trigger: configured to receive user input for release of pressurized steam from the second steam nozzle 114; and, in response to receiving the user input, output a signal representing the user input.

In one implementation, the handheld steaming wand 110 further includes a set of sensors 142 including a distance sensor, such as an ultrasonic distance sensor, a light detection, and/or a ranging sensor: arranged on the head 112 of the handheld steaming wand 110; and configured to output signals representing distance between the handheld steaming wand 110 and the garment.

In one implementation, the set of sensors 142 further includes a motion sensor, such as an inertial measurement unit: arranged on the head 112 of the handheld steaming wand 110; and configured to output signals representing position and orientation of the handheld steaming wand 110 relative to the garment. In one example, the motion sensor can output signals representing linear acceleration of the handheld steaming wand 110 along three orthogonal axes. In this example, the kiosk 100 can interpret these signals to calculate the position and orientation of the handheld steaming wand 110 relative to the garment.

In one implementation, the set of sensors 142 arranged on the wand 110 further includes a camera: arranged on the head 112; and configured to capture a set of images of the garment. In one example, the kiosk 100 can detect the fabric type of the garment based on the images captured by the camera.

5. Garment Processing at the Kiosk

Generally, as shown in FIGS. 1 and 4-6, the kiosk 100 can execute a series of cycles to: derive processing parameters for a garment received at the kiosk 100; automatically tension and steam the garment to remove wrinkles in the garment; automatically spray the garment with a cleaning fluid to remove odor from the garment; facilitate manual steaming of the garment by the user to produce a desired pressing quality of the garment; and dry and set the garment to prepare the garment for handling and wear.

5.1 Derivation of Processing Parameters

Generally, as shown in FIG. 1, prior to the automatic cycle during an initial setup period, the kiosk 100 can: access a set of garment characteristics including a garment dimension (e.g., size, weight), a garment type, and a fabric type of a garment loaded into a chamber 102. For example, the kiosk 100 can receive a manual selection of the garment characteristics, such as the garment dimension (or size), the garment type, and the fabric type, entered manually by the user via a dropdown menu or an image-based catalog rendered on a graphical user interface 132 arranged on the kiosk 100.

Then, based on the set of garment characteristics, the kiosk 100 can derive a set of processing parameters for the garment, the processing parameters including: a target processing temperature; target a setting temperature; a target drying temperature; a manual steaming duration (or a set of manual steaming durations); a quantity of manual steaming durations; a target manual steaming distance between the handheld steaming wand 110 and the garment; and a maximum wetting rate. For example, the kiosk 100 can retrieve the set of processing parameters corresponding to the garment characteristics from a look-up table or a database linking different garment types, fabric types, and garment dimensions to different processing parameters.

During the initial setup period, the kiosk 100 can also: unlock a chamber door 150 of the kiosk 100; and prompt the user to load the garment into the chamber 102 and tension the garment by hanging the garment on the hanger 104 inside the chamber 102 and clipping a set of retractable clips 124 to the torso of the garment. In one implementation, the kiosk 100 can provide instructions for loading and clipping the garment via the user interface 132 arranged on the kiosk 100. Once the user loads the garment into the chamber 102 and closes the door 150, the kiosk 100 can: lock the door 150; inflate the expandable components to stretch local regions (e.g., sleeves) of the garment and to obstruct openings in the garment; and initiate an automatic cycle.

5.1.1 Setting the Temperature Parameters and Steam Nozzle Path

In one implementation, the kiosk 100 can set the target processing temperature primarily based on a transition temperature of the fabric type of the garment. More specifically, to set the target processing temperature the kiosk 100 can: access the transition temperature of the fabric type of the garment (e.g., from a look-up table or a database); and set the target processing temperature to X degrees (e.g., Celsius, Fahrenheit) higher than the transition temperature. For example, the kiosk 100 can derive a lower target processing temperature for a silk garment than for a cotton garment, as silk transition temperature is lower than a cotton transition temperature. Therefore, the kiosk 100 can set the target processing temperature: exceeding the transition temperature of the fabric type of the garment to enable release of wrinkles in the fabric; and proximal the target setting temperature to ensure quick setting of the fabric of the garment.

In one implementation, the kiosk 100 can derive the target stetting temperature for the automatic cycle based on the transition temperature of the garment fabric and/or based on the target processing temperature. For example, the kiosk 100 can set the target setting temperature to Y degrees lower than the target processing temperature and Z degrees lower than the transition temperature. Therefore, the kiosk 100 can set the target setting temperature: lower than the transition temperature to enable setting of the garment in the wrinkle-free state at a completion of the automatic cycle; and proximal the target processing temperature to ensure that select regions of the garment can reach the target processing temperature during the manual steaming cycle.

In one implementation, as described in U.S. patent application Ser. No. 18/582,637, which is incorporated herein by reference, during the initial setup period, the kiosk 100 can: access the set of garment characteristics of the garment arranged within the chamber 102, the set of garment characteristics including a garment dimension (e.g., size), a garment type, and a fabric type; and, based on the set of garment characteristics, access a set of processing parameters for the garment. For example, the set of processing parameters can include: a first processing temperature exceeding a transition temperature associated with the fabric type; a first steam nozzle 106 path; and a first drying temperature less than the transition temperature.

Accordingly, the kiosk 100 can set the first processing temperature of the chamber 102 for the automatic cycle, the first processing temperature exceeding the transition temperature. Thus, the kiosk 100 can set a processing temperature parameter to the first processing temperature predicted to heat the garment above the transition temperature of the garment during the automatic cycle and trigger transition of the garment fabric from a relatively rigid state to a relatively malleable state, which facilitates removal of wrinkles and creases from the garment fabric.

Furthermore, the kiosk 100 can set a steam nozzle path parameter to the first steam nozzle 106 path tailored to a specific geometry of the garment represented by the garment type. Thus, the kiosk 100 can set the first steam nozzle 106 path for the garment, the first steam nozzle 106 path predicted to: facilitate wrinkle-release in the garment though application of steam to the garment though the first steam nozzle 106; and, simultaneously, avoid overheating, over-wetting, permanently stretching, or otherwise damaging the garment during the application of steam though the first steam nozzle 106. Additionally, by setting the first steam nozzle 106 path tailored to the specific geometry of the garment, the kiosk 100 can avoid expelling excess steam onto the garment during execution of the first steam nozzle 106 path and thereby reduce energy consumption of the steam generator 122.

In addition, the kiosk 100 can set the first drying temperature—of the chamber 102 for the drying cycle—less than the transition temperature based on the set of garment characteristics (e.g., fabric type, garment dimension, garment type). Thus, the kiosk 100 can set the first drying temperature predicted to heat the garment below the transition temperature during the drying cycle and trigger transition of the garment fabric from the relatively malleable state to the relatively rigid state, which facilitates setting the garment fabric in the pressed, wrinkle-free state.

5.1.2 Setting the Maximum Wetting Rate

In one implementation, based on the set of garment characteristics, the kiosk 100 can access the maximum wetting rate for the garment during the manual steaming cycle. For example, the kiosk 100 can set the maximum wetting rate based on the properties of the fabric, such as fabric type, as some fabric types are characterized by high moisture absorption rates, which can cause overwetting and delay drying. Therefore, during the manual steaming cycle, the kiosk 100 can direct the user to maintain a target traversal rate of the wand 110 corresponding a target wetting rate, below the maximum wetting rate, to avoid overwetting the garment and ensure complete drying of the garment over a shortest time period.

5.1.3 Setting the Target Manual Steaming Distance

In one implementation, based on the set of garment characteristics, the kiosk 100 can access the target manual steaming distance between the wand 110 and the garment during the manual steaming cycle. More specifically, the kiosk 100 can set the target manual steaming distance based on the fabric type of the garment. For example, the kiosk 100 may set a first target manual steaming distance for a first garment composed of delicate fabric such as silk, the first target manual steaming distance exceeding a second target manual steaming distance set of a second garment composed of a durable fabric, such as canvas. In another example, the kiosk 100 may set a third target manual steaming distance for a third garment composed of a water-absorbent fabric, the third target manual steaming distance exceeding a fourth target manual steaming distance for a fourth garment composed of a water-repellant fabric. Therefore, the kiosk 100 can set the target manual steaming distance predicted to: facilitate wrinkle-release in select regions of the garment through manual application of steam; and prevent damaging or over-wetting of the select region of the garment through the manual application of steam. Accordingly, during the manual steaming cycle, the kiosk 100 can prompt the user to maintain the target manual steaming distance between the wand 110 and the garment to avoid damaging and/or over-wetting local regions of the garment and reduce a drying duration of the garment.

5.1.4 Setting the Minimum Steaming Distance

In one implementation, based on the set of garment characteristics, the kiosk 100 can access a minimum steaming distance between the wand 110 and the garment during the manual steaming cycle. More specifically, the kiosk 100 can access a minimum steaming distance predicted to prevent the wand 110 and/or the second steam nozzle 114 from coming into contact with the garment during the manual steaming cycle. For example, in response to detecting a first distance, below the minimum steaming distance, between the wand 110 and the garment, the kiosk 100 may deactivate the second steam nozzle 114 to avoid overwetting the garment. Therefore, the kiosk 100 can access the minimum steaming distance predicted to prevent damage or over-wetting of the garment due to contact between the second steam nozzle 114 and the garment.

5.1.5 Setting the Manual Cycle Duration

In one implementation, based on the set of garment characteristics including the garment dimension, the fabric type, and the garment type, the kiosk 100 can access the set of processing parameters including the manual steaming cycle duration. For example, the kiosk 100 can derive a manual steaming cycle duration proportional to the garment dimension. Accordingly, the kiosk 100 can set a longer manual steaming cycle duration for a first garment, characterized by a size "large," than for a second garment, characterized by a size "small," as surface area of the first garment exceeds the surface area of the second garment. Therefore, the kiosk 100 can set the manual steaming cycle duration tailored to a particular garment to allocate sufficient length of time to the manual steaming cycle to enable the user to manually steam select regions of the garment that may remain wrinkled after the automatic cycle (e.g., regions inaccessible to the first steam nozzle 106).

In one implementation, based on the set of garment characteristics, kiosk 100 can access the set of processing parameters including: a quantity of manual steaming durations to execute during the manual steaming cycle; and a set of manual steaming durations, each manual steaming duration corresponding to a region of the garment. For example, based on the garment type, the kiosk 100 can predict a set of loose regions-such as pockets, collars, and sleeves—that cannot be tensioned with the set of retractable clips 124, sleeve retainers, or expandable components. Then, the kiosk 100 can assess the quantity of the loose regions of the garment in the set of loose regions of the garment; and set the quantity of manual steaming durations equal to the quantity of loose regions of the garment.

In one implementation, the kiosk 100 can: access a first image from a camera arranged within the chamber 102; based on the first image, detect a set of garment characteristics including a garment type and a set of regions of the garment inaccessible to the first steam nozzle 106 (and the third and fourth steam nozzles of the sleeve retainers); and, based on the set of garment characteristics, derive a set of processing parameters for the garment, the set of processing parameters including a set of manual steaming durations, each manual steaming duration corresponding to a garment region in the set of regions.

Furthermore, the kiosk 100 can: estimate a unique manual steaming duration for each loose region of the garment in the set of loose regions of the garment based on the surface area, size, or geometry of the loose region of the garment; and compile each unique manual steaming duration into a set of manual steaming durations. For example, the kiosk 100 can estimate a longer manual steaming duration for a larger loose region of the garment (e.g., a large pocket) than for a smaller loose region of the garment (e.g., a small pocket).

5.1.6 Setting the Drying Duration

In one implementation, based on the set of garment characteristics, the kiosk 100 can access the set of processing parameters including a target drying duration of the drying cycle. For example, the kiosk 100 can calculate the target drying duration proportional to the garment dimension. Therefore, based on the set of garment characteristics, the kiosk 100 can set the target drying duration predicted to facilitate complete drying of the garment.

In one implementation, based on the set of garment characteristics, the kiosk 100 can access the set of processing parameters including a nominal drying duration of the drying cycle, the nominal drying duration corresponding to a minimum time duration predicted to facilitate complete drying of the garment after the automatic cycle (i.e., withholding execution of the manual steaming cycle). At the completion of the manual steaming cycle, the kiosk 100 can: access or calculate an additional drying duration based on the manual steaming duration or the wetting rate of the garment; and calculate the total drying duration for the drying cycle based on the nominal drying duration and the additional drying duration. Therefore, based on the set of garment characteristics, the kiosk 100 can access the nominal drying duration, which can be used to calculate the total drying duration predicted to facilitate complete drying of the garment after the manual steaming cycle.

5.2 Automatic Cycle

Block S110 of the method S100 recites, during an automatic cycle, articulating a first steam nozzle 106, arranged within the kiosk 100, along a target steam nozzle path to: impinge a first steam jet across an interior surface of the garment; and tension local areas of the garment against the first steam jet. Generally, in Block S110, the kiosk 100 can execute the automatic cycle based on the set of processing parameters to: increase the ambient temperature within the chamber 102 of the kiosk 100 toward the target processing temperature to increase the malleability of the garment fabric; steam the garment via the first steam nozzle 106 to smooth wrinkles in the garment; and reduce the ambient temperature within the chamber 102 toward the setting temperature to increase the rigidity of the garment fabric and set the garment in the wrinkle-free state. Therefore, in Block S110, the kiosk 100 can execute the automatic cycle to automatically remove wrinkles from the garment.

More specifically, during the automatic cycle, the kiosk 100 can: actuate the set of heating elements in the kiosk 100 to drive the ambient environment within the chamber 102 toward the target chamber 102 processing temperature; and articulate the first steam nozzle 106, facing the interior surface of the garment, along the steam nozzle path to expel the first steam jet across the interior surface of the garment, tension local regions of the garment, and to heat local regions above the transition temperature. Then, in response to completion of the steam nozzle path by the first steam nozzle 106, the kiosk 100 can actuate a set of dryers 136 to drive the ambient environment within the chamber 102 toward the target chamber 102 setting temperature, below the transition temperature, to set regions of the garment in the wrinkle-free state.

In one implementation, during the automatic cycle, the kiosk 100 can: heat air within the chamber 102 toward the first processing temperature, exceeding the transition temperature associated with the fabric type of the garment; and articulate the first steam nozzle 106 along the target steam nozzle path. Generally, the kiosk 100 can heat air within the chamber 102 toward the first processing temperature by supplying heated air to the chamber 102 via the set of dryers 136 (e.g., hot dryer). The kiosk 100 can also increase the ambient humidity withing the chamber 102. By elevating conditions within the ambient chamber 102 to the target processing temperature and increasing the ambient humidity, the kiosk 100 can elevate the garment temperature above the transition temperature, which decreases the rigidity of the garment fabric. The kiosk 100 can then articulate the first steam nozzle 106 along the target steam nozzle path to tension local regions of the garment and release wrinkles within the garment. Thus, by driving the chamber temperature toward the first processing temperature and then executing the first steam nozzle 106 path, the kiosk 100 can release wrinkles in the garment.

In particular, during the automatic cycle, the kiosk 100 can steam the garment by opening the first steam valve (e.g., the steam valve connecting the steam generator 122 to the first steam nozzle 106) and triggering a multi-axis stage to sweep the first steam nozzle 106 along the nozzle path to deliver the first steam jet to the surface of the garment.

During the automatic cycle, the kiosk 100 can also: monitor temperature and humidity conditions within the chamber 102 via temperature and humidity sensors arranged in the chamber 102; and selectively activate the hot and cold dryers (e.g., directed away from the garment) and open the chamber 102 vent to maintain chamber 102 conditions specified in the processing parameters.

Upon completion of the steam nozzle path, the kiosk 100 activates and sets the cold dryer to face away from the garment to circulate air within the kiosk 100 and thus cool the garment based on the processing parameters, thereby setting the garment in a wrinkle-free state. In particular, by orienting the cold dryer to face away from the garment, the kiosk 100 can avoid disturbing or unsettling the garment before it has fully cooled to below the transition temperature and thus avoid creating new wrinkles in the garment.

5.3 Manual Steaming Cycle

Block S120 of the method S100 recites: triggering a valve to release steam to a wand 110 for manual manipulation over select regions of the garment to impinge a second steam jet across the select region of the garment and release wrinkles in the select region of the garment during a manual steaming cycle succeeding the automatic cycle. Generally, in Block S120, the kiosk 100 can: prompt the user to manually steam the garment inside the kiosk 100; initiate a manual steaming timer for the manual steaming duration; and activate the handheld steaming wand 110 to expel steam. Therefore, during the manual steaming cycle, the kiosk 100 can enable the user to: "touch-up" the garment by manually steaming select regions of the garment to remove any wrinkles remaining after the automatic cycle; and achieve the desired look of the garment.

Generally, after the ambient environment within the chamber 102 reaches the target setting temperature, the kiosk 100 executes the manual steaming cycle. To initiate the manual steaming cycle, the kiosk 100: serves a prompt to manually steam the garment inside the kiosk 100; initiates a manual steaming timer for the manual steaming duration; and activates the handheld steaming wand 110 to expel steam. For example, the kiosk 100 can serve the prompt by rendering graphical or textual instructions for using the handheld steaming wand 110 via the user interface 132. The user interface 132 may also present an option to cancel the manual steaming cycle and proceed to the cooling cycle.

In one implementation, the kiosk 100 can activate the handheld steaming wand 110 to expel the second steam jet by opening the second valve (e.g., the valve connecting the steam generator 122 to the steam supply line 116) in response to the user picking up the handheld steaming wand 110 from the wand mount 134. For example, the kiosk 100 can activate the handheld steaming wand 110 to expel the second steam jet in response to receiving a signal from a sensor, such as an optical sensor or force sensor, arranged on the wand mount 134, the signal indicating an absence of the handheld steaming wand 110 in the wand mount 134. Alternatively, the kiosk 100 can activate the handheld steaming wand 110, in response to receiving a user input from the trigger 144 arranged on the handheld steaming wand 110.

Generally, the kiosk 100 can deactivate the handheld steaming wand 110 by closing the second valve between the steam generator 122 and the steam supply line 116 in response to expiration of the manual steaming timer. Following the expiration of the manual steaming timer, the kiosk 100 can initiate the cooling cycle by actuating a set of dryers 136 to remove moisture from the garment and to cool the garment below the target chamber 102 setting temperature.

5.3.1 Wand Removal from Chamber

Figure 6:
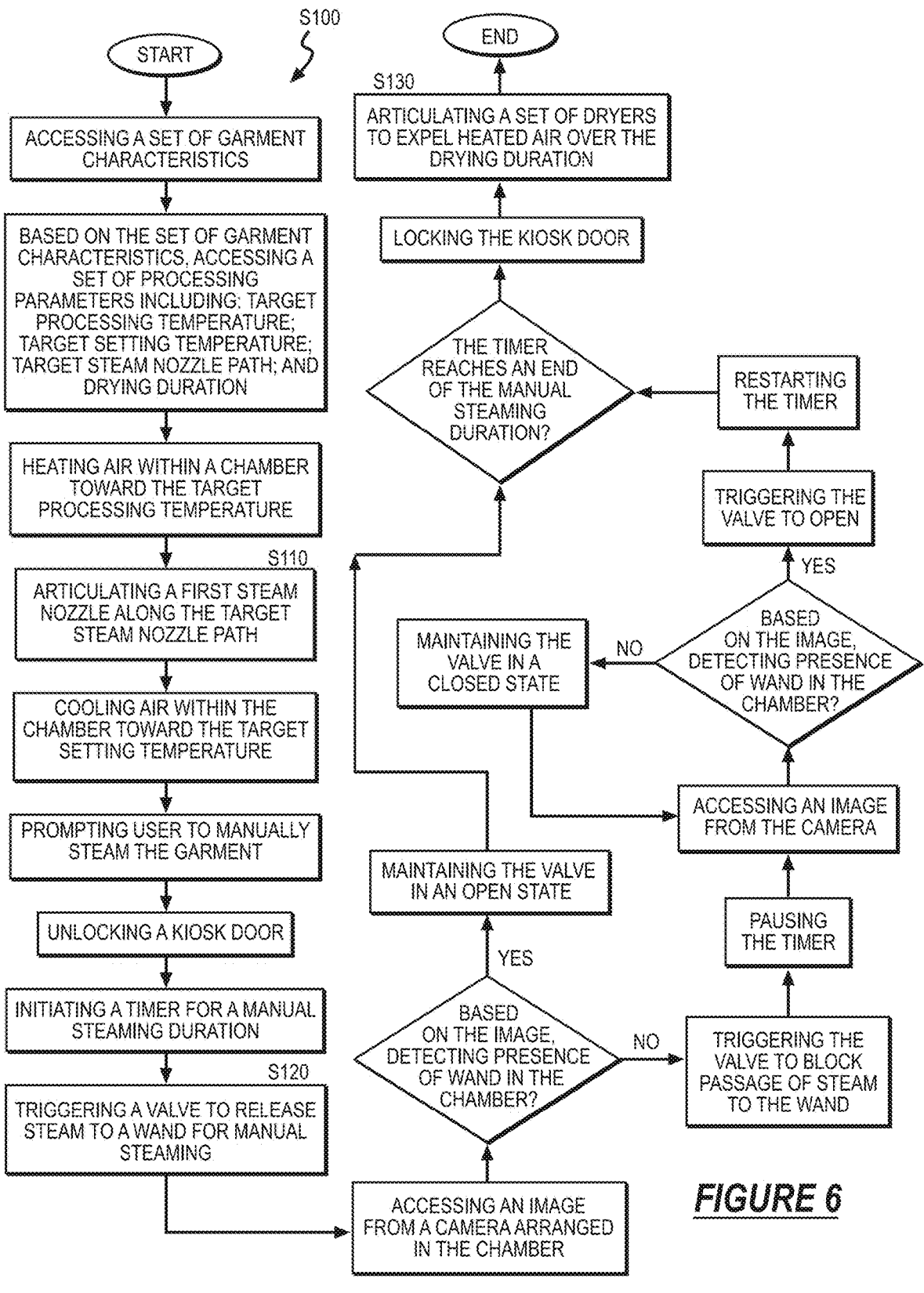
FIG. 6 is a flowchart representation of one variation of the method.

In one implementation, shown in FIG. 6, the kiosk 100 can deactivate the handheld steaming wand 110 in response to detecting an absence of the handheld steaming wand 110 within the chamber 102 of the kiosk 100. In this implementation, at a first time, the kiosk 100 can: access a first image from a camera arranged within the chamber 102; based on the first image, detect absence of the handheld steaming wand 110 within the chamber 102; and, in response to detecting absence of the handheld steaming wand 110 within the chamber 102, trigger the second valve to close to block passage of steam to the wand 110 and deactivate the handheld steaming wand 110. Therefore, the kiosk 100 can deactivate the handheld steaming wand 110, in response to detecting an absence of the handheld steaming wand 110 in the chamber 102 to: avoid steam escaping the kiosk 100 and therefore reduce energy consumption of the steam generator 122; and ensure that the second steam jet does not wet the user.

In this implementation, at a second time, the kiosk 100 can: access a second image from the camera arranged within the chamber 102; based on the second image, detect presence of the wand 110 in the chamber 102; and trigger the second valve to release steam to the wand 110 in response to detecting presence of the wand 110 in the chamber 102. Therefore, the kiosk 100 can supply steam to the second steam nozzle 114 only when the wand 110 is inside the chamber 102.

5.3.2 Real-Time Distance Feedback

Figure 4:
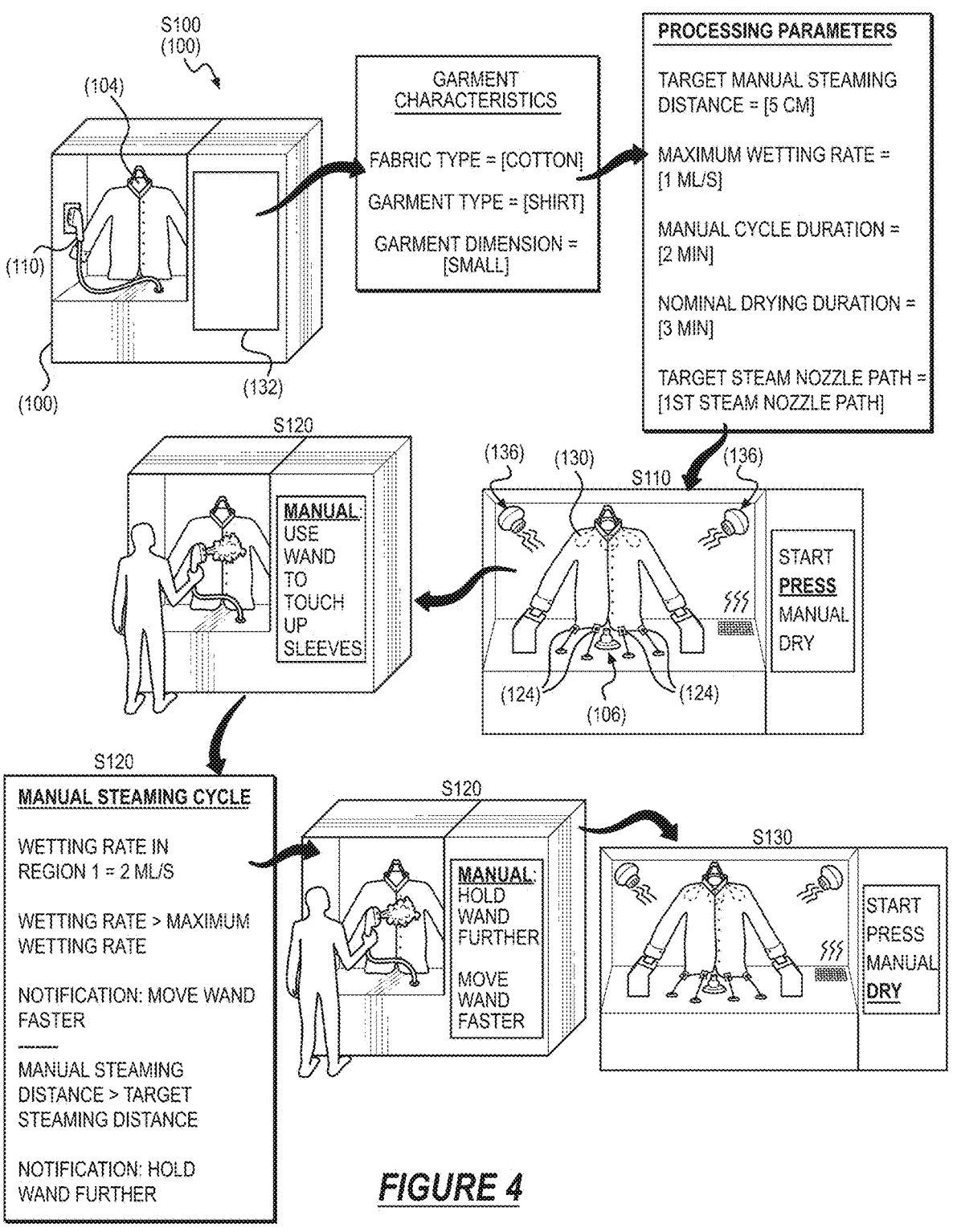
FIG. 4 is a flowchart representation of one variation of the method.

Generally, as shown in FIG. 4, the kiosk 100 can provide real-time feedback about the distance between the wand 110 and the garment to the user to improve the outcome of the manual steaming of the garment.

In one implementation, the kiosk 100 can prompt a user to increase or decrease a distance between the wand 110 and the garment in response to the distance falling outside of a target manual steaming distance range. For example, the kiosk 100 can prompt the user to increase the distance between the wand 110 and the garment via an audible prompt emitted from a speaker arranged on the side of the kiosk 100 or via a visual prompt displayed on a user interface 132 arranged on the side of the kiosk 100 or the wand 110.

More specifically, at a first time during the manual steaming cycle, the kiosk 100 can: access a first signal from a distance sensor arranged on the handheld steaming wand 110; based on the first signal, interpret a first distance between the handheld steaming wand 110 and the garment; calculate a first difference between the target manual steaming distance and the first distance; and, in response to the first difference falling below a first threshold, prompt the user to decrease the a current distance between the wand 110 and the garment. In one example, the kiosk 100 can prompt the user to decrease the current distance between the wand and the garment by triggering a first vibration of the wand, the first vibration characterized by a first vibration pattern and a first vibration duration. In another example, the kiosk 100 can prompt the user to decrease the current distance between the wand and the garment by triggering light emission from a first light element (e.g., red LED) arranged on the wand or the kiosk 100 and characterized by a first color (e.g., red). In this example, the kiosk 100 can trigger light emission from a second light element (e.g., green LED)—arranged proximal the first light and characterized by a second color (e.g., green)—to indicate that the steaming distance approximates (e.g., is within the threshold difference of) the target steaming distance.

At a second time during the manual steaming cycle, the kiosk 100 can: access a second signal from the distance sensor; based on the second signal, interpret a second distance between the garment and the wand 110; calculate a second difference between the target manual steaming distance and the second distance; and, in response to the second difference exceeding a second threshold, prompt the user to increase the current distance between the wand 110 and the garment.

For example, the kiosk 100 can prompt the user to increase the current distance between the wand and the garment by triggering a second vibration of the wand, the second vibration characterized by a second vibration pattern, different from the first vibration pattern, and a second vibration duration, different from the first vibration duration. Additionally, or alternatively, the kiosk 100 can prompt the user to increase the current distance between the wand and the garment by triggering light emission from the first light element (e.g., red LED).

Accordingly, during the manual steaming cycle, the user may bring the wand too close to the garment, thereby overwetting the garment and resulting in a region of the garment remaining moist following the drying cycle, which may reduce user satisfaction. To ensure complete drying of the garment, the kiosk 100 can increase the drying duration of the drying cycle, which may reduce throughput of the kiosk 100, or increase the drying temperature, which may damage the garment fibers. The user may also bring the wand too far from the garment, thereby not delivering enough steam to a select region of the garment to release wrinkles in that region.

Thus, the kiosk 100 can provide real-time guidance to the user regarding the distance between the wand and the garment to: prevent overwetting of the garment; ensure that the garment is completely dry at the end of the drying cycle; and eliminate a need to increase the drying duration or the drying temperature. Thus, the kiosk 100 can avoid damaging the garment fibers, maintain high throughput of the kiosk 100, and ensure user satisfaction with the garment retrieved from the kiosk 100 at the end of the drying cycle. Furthermore, by providing real-time guidance to the user regarding the distance between the wand and the garment, the kiosk 100 can ensure that the second nozzle is close enough to the garment for the second steam jet to moisten and tension a select region of the garment facilitating wrinkle removal from that region.

5.3.3 Steaming Duration Tracking

Generally, as shown in FIG. 6, the kiosk 100 can execute the manual steaming cycle over the manual steaming cycle duration (e.g., duration of the manual steaming cycle). In one implementation, during the manual steaming cycle, the kiosk 100 can: prompt a user to manually steam the garment;

initiate a timer for the manual steaming cycle duration; trigger the second valve to release steam to the wand 110, in response to initiation of the timer; and, in response to the timer reaching the manual steaming cycle duration, trigger the valve to block passage of steam to the wand 110. Thus, the kiosk 100 can supply steam to the wand 110 for the duration of the manual steaming cycle.

In one implementation, during the manual steaming cycle, the kiosk 100 can pause the timer when the passage of steam to the wand 110 is blocked, thereby enabling the kiosk 100 to temporarily pause manual steaming of the garment during the manual steaming cycle without reducing the manual steaming duration (e.g., a duration of active expulsion of steam from the second steam nozzle 114). In this implementation, at a first time during the manual steaming cycle, the kiosk 100 can: access a first signal from the distance sensor; based on the first signal, interpret a first distance between the wand 110 and the garment; and, in response to the first distance falling below the minimum steaming distance, trigger the second valve to block passage of steam to the wand 110, pause the timer, and alert the user that the distance between the wand 110 and the garment fell below the minimum steaming distance. In this implementation, at a second time succeeding the first time, the kiosk 100 can: access a second signal from the distance sensor; based on the second signal, interpret a second distance between the wand 110 and the garment; and, in response to the second distance exceeding the minimum steaming distance, restart the timer and trigger the second valve to resume releasing stem to the wand 110.

Similarly, during the manual steaming cycle, the kiosk 100 can: simultaneously pause the timer and trigger the second valve to block passage of steam to the wand 110, in response to accessing a first user input (e.g., user input representing pause of manual steaming); and simultaneously resume the timer and trigger the second valve to release steam to the wand 110 in response to accessing a second user input (e.g., user input representing start of manual steaming). Furthermore, the kiosk 100 can sequentially block passage of steam to the wand 110 while pausing the timer for the manual steaming duration to enable the user to transition between steaming a set of distinct regions of the garment.

Therefore, in one implementation, the kiosk 100 can temporarily deactivate the wand 110 (e.g., in response to the distance between the wand 110 and the garment falling below the minimum steaming distance) and enable the user to temporarily pause manual steaming of the garment during the manual steaming cycle without reducing the manual steaming duration when the steam is actively expelled from the second steam nozzle 114. During these temporary pauses, the kiosk 100 can provide steaming instructions to the user, thereby enabling the user to assess the state of the garment and/or transition the wand 110 between steaming distinct regions of the garment.

5.3.4 Real-Time Traversal Rate Feedback

In one implementation, shown in FIG. 4, at a first time during the manual steaming cycle, the kiosk 100 can: access a first signal from a distance sensor arranged on the wand 110, the first signal representing a first distance between the wand 110 and the garment; access a first set of motion data from a motion sensor (e.g., inertial measurement unit) arranged on the wand 110, the first set of motion data representing a first position and a first orientation of the wand 110 relative to the garment; and interpret a first location of impingement of the second steam jet on the garment at the first time based on the first set of motion data. At a second time during the manual steaming cycle, the kiosk 100 can further: access a second signal from the distance sensor, the second signal representing a second distance between the wand 110 and the garment; access a second set of motion data from the motion sensor, the second set of motion data representing a second position and a second orientation of the wand 110 relative to the garment; and interpret a second location of impingement of the second steam jet on the garment at the second time based on the second set of motion data.

Then, the kiosk 100 can: calculate a first distance traveled by the wand between the first time and the second time; access a first volume of steam expelled between the first time and the second time by the second steam nozzle 114; calculate a traversal rate of the second steam jet on the garment based on the first volume, the first distance, the first time, and the second time; estimate a wetting rate of the garment proximal the first location and the second location based on the traversal rate; and, in response to the wetting rate exceeding the maximum wetting rate, prompt the user to increase traversal rate of the handheld steaming wand 110. For example, the kiosk 100 can render the prompt textually or graphically on the user interface 132 arranged on the side of the kiosk 100.

For example, the kiosk 100 can prompt the user to increase or decrease the traversal rate of the wand by serving an audible notification via the speaker arranged on the kiosk 100 and/or by serving a visual notification via the user interface arranged on the kiosk 100 or the wand.

During the manual steaming cycle, the user may move the wand too slowly over a region of the garment, thereby overwetting that region and resulting in that region remaining moist following the drying cycle, which may reduce user satisfaction. To ensure complete drying of the garment, the kiosk 100 can increase the drying duration of the drying cycle, which may reduce throughput of the kiosk 100, or increase the drying temperature, which may damage the garment fibers. The user may also move the wand too fast over the region, thereby not delivering enough steam to the region to release wrinkles in that region.

Accordingly, the kiosk 100 can provide real-time guidance to the user regarding the traversal rate of the wand over the garment to: prevent overwetting of the garment; ensure that the garment is completely dry at the end of the drying cycle; and eliminate a need to increase the drying duration or the drying temperature. Thus, the kiosk 100 can avoid damaging the garment fibers, maintain high throughput of the kiosk 100, and ensure user satisfaction with the garment once retrieved from the kiosk 100 at the end of the drying cycle. Furthermore, by providing real-time guidance to the user regarding the distance between the wand and the garment, the kiosk 100 can ensure that the user moves the wand at a traversal rate that facilitates the second steam jet moistening and tensioning a select region of the garment facilitating wrinkle removal from that region.

5.3.5 Sequential Manual Steaming

In one implementation, shown in FIG. 1, the kiosk 100 can: detect the set of regions of the garment for sequential manual steaming; access a set of manual steaming durations for the set of regions; and execute the manual steaming cycle prompting the user to steam each region in the set of regions. For example, the kiosk 100 can detect: the set of regions inaccessible to the first steam nozzle 106, the third steam nozzle, and the fourth steam nozzle; and/or the set of regions inaccessible to the set of clips, the set of expandable components 130, and/or the set of sleeve retainers. The kiosk 100 can automatically detect such regions during the initial setup period and enable the user to manually steam each region individually during the manual steaming cycle. Additionally, or alternatively, after the completion of the manual steaming cycle and prior to initiation of the manual steaming cycle, the kiosk 100 can automatically detect the set of regions that remain wrinkled. Additionally, or alternatively, during the initial setup period, based on the garment type, the kiosk 100 can access the set of regions predicted to remain wrinkled after the automatic cycle (due to being inaccessible to the first, third, and fourth steam nozzles, or due to being inaccessible to the tensioners).

In one implementation, at a first time during the manual steaming cycle, the kiosk 100 can: prompt the user to manually steam a first region (e.g., breast pocket) in the set of regions; initiate a timer for the first manual steaming duration; trigger the second valve to release steam to the wand 110 for manual manipulation over the first region for a first manual steaming duration, in the set of manual steaming durations; and, in response to the timer reaching the first manual steaming duration, trigger the second valve to block passage of steam to the wand 110.

In this implementation, at a second time during the manual steaming cycle, the kiosk 100 can: prompt the user to manually steam a second region in the set of regions; initiate a timer for the second manual steaming duration; trigger the second valve to release steam to the wand 110 for manual manipulation over the second region for a second manual steaming duration, in the set of manual steaming durations; and, in response to the timer reaching the second manual steaming duration, trigger the second valve to block passage of steam to the wand 110.

Accordingly, the kiosk 100 can: detect or access the set of regions of the garment (regions that are wrinkled or are predicted to contain wrinkles following the automatic cycle); and, during the manual steaming cycle, execute a manual steaming session for each region, thereby enabling the user to steam each region individually and manipulate (e.g., manually tension, reposition on the hanger 104, re-clip via the set of retractable clips 124) the garment between each steaming session. Thus, the kiosk 100 can provide the user with sufficient time to steam each region and facilitate complete wrinkle removal from the garment.

In one implementation, during the manual steaming cycle, at the first time, the kiosk 100 can: access a first set of motion data from a motion sensor arranged on the wand 110, the first set of motion data representing a first position of the wand 110 relative to the garment; interpret a first location of steam jet impingement on the garment at the first time based on the first position; and, in response to detecting that the first position falls outside of the first region, prompt the user to move the wand 110 to the first region.

Thus, the kiosk 100 can provide instructions to the user to enable the user to: spend a target amount of time steaming each region of the garment; avoid spending an excessive amount of time manually steaming one region of the garment. Thus, the kiosk 100 can provide the user with sufficient time to manually steam each region in the set of regions (e.g., set of wrinkled regions, set of regions inaccessible to the first steam nozzle 106 or the tensioners) without extending the manual steaming cycle duration. By providing the user with sufficient time to manually steam each region in the set of regions, the kiosk 100 facilitates complete wrinkle removal from the garment and ensures user satisfaction.

5.4 Drying Cycle

Block S130 of the method S100 recites, during a drying cycle succeeding the manual steaming cycle, actuating a set of dryers 136 to drive a chamber temperature of the chamber

102 toward a target drying temperature and to remove moisture, applied to the garment during the automatic cycle and the manual steaming cycle, from the garment. Generally, in Block S130, the kiosk 100 can: actuate the set of dryers 136 (e.g., hot dryer) to direct hot air toward the garment to drive the chamber temperature toward the target drying temperature. By propelling hot air into the chamber 102 and toward the garment, the kiosk 100 can: decrease ambient humidity within the chamber 102 by diluting the moist air within the chamber 102 with hot, dry air; and facilitate evaporation of moisture from the garment. Therefore, by triggering the set of dryers 136 to propel hot air toward the garment, the kiosk 100 can facilitate removal of moisture from the garment, thereby drying the garment and preparing the garment for handling by the user immediately following completion of the drying cycle.

Figure 5:
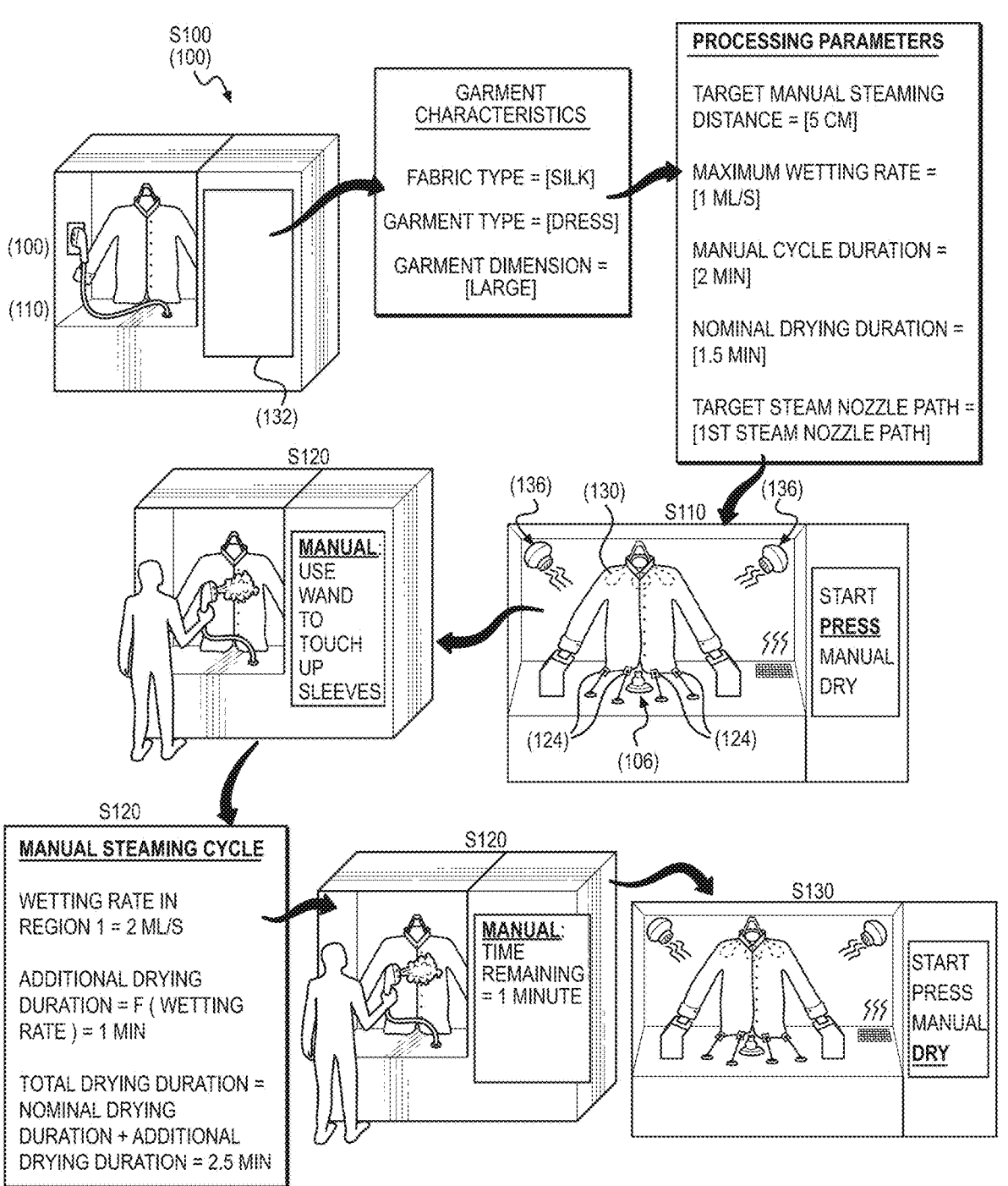
FIG. 5 is a flowchart representation of one variation of the method.

In one implementation, shown in FIGS. 4-5, during a drying cycle succeeding the manual steaming cycle, the kiosk 100 can actuate the set of dryers 136 to drive a chamber temperature of the chamber 102 toward a target drying temperature over the target drying duration or the total drying duration. Thus, the kiosk 100 can actuate the set of dryers 136 to completely remove moisture from the garment prior to the completion of the drying cycle.

In one implementation, the kiosk 100 can: actuate the set of dryers 136 to drive the chamber temperature toward the target drying temperature including the first drying temperature below the transition temperature of the garment fabric. In this implementation, during the drying cycle, the kiosk 100 can trigger the set of dryers 136 (e.g., cold dryer) to propel cold air toward the garment to drive the chamber temperature toward the first drying temperature and to: drive the garment temperature below the transition temperature of the garment; and facilitate a transition of the garment fabric from a malleable state to a rigid state, thereby ensuring that the garment will remain unwrinkled over a period of time, such as a day or a week, following processing at the kiosk 100. Therefore, by driving the chamber temperature toward the setting temperature, the kiosk 100 can set the garment in a lasting unwrinkled state.

During the drying cycle, the kiosk 100 can: monitor temperature and humidity conditions within the chamber 102 via the temperature and humidity sensors arranged in the chamber 102; and selectively activate the hot and cold dryers (e.g., directed away from the garment) and open a chamber 102 vent to drive the ambient environment within the chamber 102 below the target drying temperature and reduce humidity inside the chamber 102.

5.5 Dynamic Cycles

Generally, as shown in FIGS. 5-6, the kiosk 100 can dynamically update the set of processing parameters during execution of one or more of the processing cycles (e.g., automatic cycle, manual steaming cycle, drying cycle) at the kiosk 100 in response to the certain characteristics of the garment or in response to certain actions by the user. For example, the kiosk 100 can increase a duration of the automatic cycle and modify the steam nozzle path of the first steam nozzle 106 in response to detecting wrinkles on the garment after completing 50% of the automatic cycle. In another example, the kiosk 100 can increase a duration of the drying cycle in response to overwetting of the garment during the manual steaming cycle.

In one implementation, during the manual steaming cycle, the kiosk 100 can: estimate a wetting rate of the garment proximal the first location and the second location; in response to the wetting rate exceeding the maximum wetting rate, calculate an additional drying duration of the drying <table>
<tr><td>25</td><td>26</td></tr>
</table> cycle based on the wetting rate of the garment proximal the first location and the second location; and, based on the nominal drying duration and the additional drying duration, calculate a total drying duration of the manual steaming cycle. Then, during the drying cycle, the kiosk 100 can actuate the set of dryers 136 over the total drying duration. Additionally, or alternatively, in response to the wetting rate exceeding the maximum wetting rate, the kiosk 100 can calculate an updated drying temperature for the drying cycle based on the wetting rate. Then, during the drying cycle, the kiosk 100 can actuate the set of dryers 136 to increase ambient temperature within the chamber 102 toward the updated drying temperature. Accordingly, in response to the wetting rate exceeding the maximum wetting rate, which indicates overwetting of the garment, the kiosk 100 can increase the duration of the drying cycle and/or increase the drying temperature to facilitate complete moisture removal from the garment.

In one implementation, the kiosk 100 can calculate the total drying duration for the drying cycle based on the manual steaming duration. More specifically, during the manual steaming cycle, the kiosk 100 can: prompt the user to manually steam the garment; at a first time, access a first signal representing a first user input to deliver steam to the garment; and, in response to the first signal, initiate a timer for a manual steaming duration and trigger the second valve to release steam to the wand 110. Then, the kiosk 100 can: access a second signal representing a second user input to terminate steam delivery to the garment at a second time; in response to the second signal, trigger the second valve to block passage of steam to the wand 110 and terminate the timer for the manual steaming duration; and, based on the manual steaming duration and the nominal drying duration, calculate a total drying duration for the drying cycle. For example, the kiosk 100 can: calculate an additional drying duration proportional to the manual steaming duration; and calculate the total drying duration based on the additional drying duration and the nominal drying duration. Then, the kiosk 100 can execute the drying cycle over the total drying duration. Additionally, or alternatively, the kiosk 100 can increase the drying temperature proportionally to the manual steaming duration.

Accordingly, the kiosk 100 can calculate the total drying duration for the drying cycle based on the duration over which the second steam nozzle 114 expelled steam. Thus, the kiosk 100 can dynamically adjust the total drying duration to facilitate complete drying of the garment over a shortest duration of the drying cycle. Calculate the total drying duration for the drying cycle based on the manual steaming duration, can enable the kiosk 100 to: avoid wasting energy by actuating the set of dryers 136 for a duration exceeding a minimum time to dry the garment; and increase throughput of the kiosk 100 (by processing the garment within a shortest duration).

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A kiosk comprising:
a chamber;
a hanger arranged within the chamber and configured to receive a garment;
a first steam nozzle:
arranged below the hanger; and
configured to expel a first steam jet along a nozzle axis and toward an interior surface of the garment to:
tension local regions of a torso of the garment; and
increase temperature of the garment toward a target temperature;
an actuator configured to autonomously traverse the first steam nozzle across the interior surface of the garment; and
a wand:
comprising:
a head configured to mate with a mount arranged inside the chamber;
a second steam nozzle:
arranged on the head; and
configured to expel a second steam jet of pressurized steam; and
a steam supply line:
configured to deliver steam from a steam generator to the second steam nozzle; and
configured for manual manipulation over the garment to expel steam to release wrinkles from select regions of the garment.

2. The kiosk of claim 1, further comprising:
the steam generator configured to supply steam to the first steam nozzle and the second steam nozzle; and
a controller configured to:
during an automatic steaming cycle, trigger a first valve to release steam from the steam generator to the first steam nozzle; and
during a manual steaming cycle, trigger a second valve to release steam from the steam generator to the second steam nozzle.

3. The kiosk of claim 1, further comprising:
a door arranged on a side of the chamber; and
a controller configured to:
detect a state of the door;
when the door is open, enable the steam generator to supply steam to the wand; and
when the door is closed, enable the steam generator to supply steam to the first steam nozzle.

4. The kiosk of claim 1, further comprising:
a door into the chamber;
a lock configured to selectively lock the door;
a heating element;
a dryer; and a controller configured to:
  initiate an automatic steaming cycle;
  during the automatic steaming cycle:
    trigger the lock to lock the door;
    activate the heating element to heat air within the
      chamber toward a processing temperature exceed-
      ing a transition temperature of the garment;
    trigger the steam generator to supply steam to the
      first steam nozzle;
    trigger the actuator to traverse the first steam jet
      across the interior surface of the garment; and
    trigger the dryer to reduce air temperature within the
      chamber below the transition temperature of the
      garment;
  initiate a manual steaming cycle;
  during the manual steaming cycle:
    trigger the lock to unlock the door; and
    during manual manipulation of the wand across the
      interior surface of the garment, trigger the steam
      generator to supply steam to the wand;
  initiate a drying cycle;
  during the drying cycle;
    trigger the lock to lock the door;
    trigger the dryer to extract moist air from the cham-
      ber to dry the garment; and
    trigger the dryer to reduce the air temperature within
      the chamber below the transition temperature of
      the garment; and
    trigger the lock to unlock the door.

5. The kiosk of claim 1, wherein the wand further com-
prises:
  a contact feature:
    extending forward from the second steam nozzle; and
    configured to:
      contact the garment during the manual manipulation
        of the wand; and
      maintain the second steam nozzle at greater than a
        threshold distance from the garment to reduce risk
        of pressurized steam, exiting the second steam
        nozzle, overwetting the garment.

6. The kiosk of claim 1, further comprising:
  a set of dryer nozzles:
    configured to blow fresh external air into the chamber;
  an exhaust vent:
    configured to release humid air from chamber; and
  a heat exchanger:
    configured to transfer heat from humid air, exiting the
      chamber via the exhaust vent, to external air entering
      the chamber via the set of dryer nozzles.

7. The kiosk of claim 1, wherein the wand further com-
prises:
  a suction slit:
    arranged on the head of the wand proximal the second
      steam nozzle;
    coupled to a vacuum line; and
    configured to collect liquid water forming on the head
      during expulsion of the second steam jet from the
      second steam nozzle.

8. The kiosk of claim 1:
wherein the wand further comprises:
  a distance sensor configured to output a first set of
    signals representing distances between the wand and
    the garment; and
  a position sensor configured to output a second set of
    signals representing position and orientation of the
    wand relative to the garment; and further comprising a controller configured to:
  access the first set of signals and the second set of
    signals;
  based on the first set of signals and the second set of
    signals, calculate a wetting rate of a first region of the
    garment proximal the wand.

9. The kiosk of claim 1:
wherein the wand further comprises a camera:
  arranged on the head; and
  configured to capture an image of the garment;
further comprising a controller configured to:
  access the image;
  based on the image, derive a fabric type of the garment;
    and
  based on the fabric type, access a cleaning fluid type for
    application onto the garment; and
further comprising a set of nozzles:
  arranged within the chamber and below the hanger; and
  configured to dispense volumes of a cleaning fluid onto
    regions of the garment to:
      modify odorous molecules in the garment; and
      perfume the garment.

10. The kiosk of claim 1, further comprising:
a valve:
  interposed between the steam generator and the second
    steam nozzle; and
  configured to selectively release pressurized steam
    from the steam generator to the second steam nozzle;
    and
a controller configured to:
  access a fabric type and a size of the garment;
  calculate a manual steaming cycle duration based on
    the fabric type and the size of the garment; and
  trigger the valve to open, to release pressurized steam
    from the steam generator to the second steam nozzle,
    for the manual steaming cycle duration.

11. A method comprising:
while a garment occupies a chamber within a kiosk:
  during an automatic steaming cycle:
    articulating a first steam nozzle, arranged within the
      kiosk, along a target steam nozzle path to:
        impinge a first steam jet across an interior surface
          of the garment; and
        tension local areas of the garment against the first
          steam jet;
  during a manual steaming cycle succeeding the auto-
    matic steaming cycle:
    triggering a valve to release steam to a wand for
      manual manipulation over a select region of the
      garment to:
        impinge a second steam jet across the select region
          of the garment; and
        release wrinkles in the select region of the gar-
          ment; and
  during a drying cycle succeeding the manual steaming
    cycle:
    actuating a set of dryers to:
      drive a chamber temperature of the chamber
        toward a target drying temperature; and
      remove moisture, applied to the garment during
        the automatic steaming cycle and the manual
        steaming cycle, from the garment.

12. The method of claim 11, further comprising:
accessing a set of garment characteristics of the garment
  arranged within the chamber, the set of garment char-
  acteristics comprising a garment dimension, a garment
  type, and a fabric type;

based on the set of garment characteristics, accessing a set of processing parameters for the garment, the set of processing parameters comprising:

a first processing temperature exceeding a transition temperature associated with the fabric type;

a first steam nozzle path;

a first setting temperature below the transition temperature; and a first drying temperature exceeding the transition temperature;

during the automatic steaming cycle:

at a first time, heating air within the chamber toward the first processing temperature; and at a second time succeeding the first time, cooling air within the chamber toward the first setting temperature;

wherein articulating the first steam nozzle along the target steam nozzle path comprises articulating the first steam nozzle along the target steam nozzle path comprising the first steam nozzle path;

wherein actuating the set of dryers to drive the chamber temperature toward the target drying temperature comprises:

at a third time, actuating the set of dryers to drive the chamber temperature toward the target drying temperature comprising the first drying temperature; and further comprising:

during the drying cycle, at a fourth time succeeding the third time, actuating a set of dryers to drive the chamber temperature toward the setting temperature.

13. The method of claim 11:

further comprising:

accessing a set of garment characteristics of the garment arranged within the chamber, the set of garment characteristics comprising a garment dimension, a garment type, and a fabric type;

based on the set of garment characteristics, accessing a set of processing parameters for the garment, the set of processing parameters comprising a manual steam cycle duration and a target manual steaming distance; and during the manual steaming cycle:

prompting a user to manually steam the garment; and initiating a timer for the manual steam cycle duration;

wherein triggering the valve to release steam to the wand comprises triggering the valve to release steam to the wand, in response to initiation of the timer; and further comprising:

during the manual steaming cycle, at a first time:

accessing a first signal from a distance sensor arranged on the wand;

based on the first signal, interpreting a first distance between the wand and the garment;

calculating a first difference between the target manual steaming distance and the first distance; and in response to the first difference exceeding a threshold, prompting the user increase the first distance between the wand and the garment; and in response to the timer reaching the manual steam cycle duration, triggering the valve to block passage of steam to the wand.

14. The method of claim 13:

wherein accessing the set of processing parameters comprises accessing the set of processing parameters comprising the manual steam cycle duration, the target manual steaming distance, and a minimum steaming distance; and further comprising, during the manual steaming cycle:

at a second time:

accessing a second signal from the distance sensor;

based on the second signal, interpreting a second distance between the wand and the garment; and in response to the second distance falling below the minimum steaming distance:

triggering the valve to block passage of steam to the wand;

pausing the timer; and alerting the user that the second distance between the wand and the garment falls below the minimum steaming distance; and at a third time succeeding the second time:

accessing a third signal from the distance sensor;

based on the third signal, interpreting a third distance between the wand and the garment; and in response to the third distance exceeding the minimum steaming distance:

restarting the timer; and triggering the valve to resume releasing stem to the wand.

15. The method of claim 11, further comprising:

accessing a set of garment characteristics of the garment arranged within the chamber, the set of garment characteristics comprising a garment dimension, a garment type, and a fabric type;

based on the set of garment characteristics, accessing a set of processing parameters for the garment, the set of processing parameters comprising a maximum wetting rate for the garment; and during the manual steaming cycle:

at a first time:

accessing a first signal from a distance sensor arranged on the wand, the first signal representing a first distance between the wand and the garment;

accessing a first set of motion data from a motion sensor arranged on the wand, the first set of motion data representing a first position and a first orientation of the wand relative to the garment; and interpreting a first location of impingement of the second steam jet on the garment at the first time based on the first distance, the first position, and the first orientation;

at a second time:

accessing a second signal from the distance sensor, the second signal representing a second distance between the wand and the garment;

accessing a second set of motion data from the motion sensor, the second set of motion data representing a second position and a second orientation of the wand relative to the garment; and interpreting a second location of impingement of the second steam jet on the garment at the second time based on the second distance, the second position, and the second orientation;

calculating a traversal rate of the second steam jet on the garment based on the first location, the first time, the second location, and the second time;

estimating a wetting rate of the garment proximal the first location and the second location based on the traversal rate; and in response to the wetting rate exceeding the maximum wetting rate, prompting a user to increase the traversal rate of the wand.

16. The method of claim 15:
wherein accessing the set of processing parameters for the garment comprises accessing the set of processing parameters comprising the maximum wetting rate and a nominal drying duration of the drying cycle for the garment based on the set of garment characteristics;
further comprising:
  in response to the wetting rate exceeding the maximum wetting rate, calculating an additional drying duration of the drying cycle based on the wetting rate of the garment proximal the first location and the second location;
  based on the nominal drying duration and the additional drying duration, calculating a total drying duration of the manual steaming cycle; and
  executing the drying cycle over the total drying duration; and
wherein actuating the set of dryers comprises actuating the set of dryers over the total drying duration.

17. The method of claim 11:
further comprising:
  accessing a set of garment characteristics of the garment arranged within the chamber, the set of garment characteristics comprising a garment dimension, a garment type, and a fabric type;
  based on the set of garment characteristics, accessing a set of processing parameters for the garment, the set of processing parameters comprising a nominal drying duration; and
  during the manual steaming cycle:
    prompting a user to manually steam the garment;
    at a first time, accessing a first signal representing a first user input to deliver steam to the garment; and
    in response to the first signal, initiating a timer for a manual steaming duration;
wherein triggering the valve to release steam to the wand comprises triggering the valve to release steam to the wand, in response to accessing the first signal;
further comprising:
  during the manual steaming cycle:
    at a second time, accessing a second signal representing a second user input to terminate steam delivery to the garment;
    in response to the second signal:
      triggering the valve to block passage of steam to the wand; and
      terminating the timer for the manual steaming duration;
    based on the manual steaming duration and the nominal drying duration, calculating a total drying duration for the drying cycle; and
    executing the drying cycle over the total drying duration; and
wherein actuating the set of dryers comprises actuating the set of dryers over the total drying duration.

18. The method of claim 11:
further comprising, during the manual steaming cycle:
  at a first time:
    accessing a first image from a camera arranged within the chamber; and
    based on the first image, detecting presence of the wand in the chamber;
wherein triggering the valve to release steam to the wand comprises triggering the valve to release steam to the wand, in response to detecting presence of the wand in the chamber; and
further comprising, during the manual steaming cycle:
  at a second time:
    accessing a second image from the camera;
    based on the second image, detecting absence of the wand inside the chamber; and
    in response to detecting absence of the wand inside the chamber, triggering the valve to block passage of steam to the wand.

19. The method of claim 11:
further comprising:
  accessing a first image from a camera arranged within the chamber;
  based on the first image, detecting a set of garment characteristics comprising a garment type and a set of regions of the garment inaccessible to the first steam nozzle;
  based on the set of garment characteristics, deriving a set of processing parameters for the garment, the set of processing parameters comprising a set of manual steaming durations, each manual steaming duration corresponding to a garment region in the set of regions; and
  at a first time during the manual steaming cycle:
    prompting a user to manually steam a first region in the set of regions; and
wherein triggering the valve to release steam to the wand for manual manipulation over the select region of the garment comprises:
  at the first time, triggering the valve to release steam to the wand for manual manipulation over the first region for a first manual steaming duration, in the set of manual steaming durations; and
  at a second time:
    prompting the user to manually steam a second region in the set of regions; and
    triggering the valve to release steam to the wand for manual manipulation over the second region for a second manual steaming duration, in the set of manual steaming durations.

20. The method of claim 19, further comprising:
during the manual steaming cycle, at the first time:
  accessing a first set of motion data from a motion sensor arranged on the wand, the first set of motion data representing a first position of the wand relative to the garment;
  interpreting a first location of steam jet impingement on the garment at the first time based on the first position; and
  in response to detecting that the first position falls outside of the first region, prompting the user to move the wand to the first region.

* * * * *